(12) United States Patent
Johnson et al.

(10) Patent No.: US 11,572,025 B2
(45) Date of Patent: *Feb. 7, 2023

(54) CAMERA SYSTEM FOR PARTICULATE MATERIAL TRAILER

(71) Applicant: INVISIONit LLC, Page, ND (US)

(72) Inventors: Steven B. Johnson, Page, ND (US); Clint D. Welch, Ada, OK (US)

(73) Assignee: INVISIONit LLC, Page, ND (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/375,878

(22) Filed: Jul. 14, 2021

(65) Prior Publication Data
US 2022/0324394 A1 Oct. 13, 2022

Related U.S. Application Data

(63) Continuation of application No. 17/226,494, filed on Apr. 9, 2021, now Pat. No. 11,066,023.

(51) Int. Cl.
*B60R 11/04* (2006.01)
*G06T 7/194* (2017.01)
*G03B 30/00* (2021.01)

(52) U.S. Cl.
CPC ............ *B60R 11/04* (2013.01); *G06T 7/194* (2017.01); *B60R 2300/303* (2013.01); *B60R 2300/808* (2013.01); *G03B 30/00* (2021.01); *G06T 2207/30252* (2013.01)

(58) Field of Classification Search
None
See application file for complete search history.

(56) References Cited

U.S. PATENT DOCUMENTS

| 2003/0031543 | A1 | 2/2003 | Elbrink |
| 2004/0130622 | A1 | 7/2004 | Lang |
| 2006/0077543 | A1 | 4/2006 | Miyoshi |
| 2010/0277345 | A1 | 11/2010 | Rodriguez |
| 2010/0288896 | A1 | 11/2010 | Church |
| 2012/0239262 | A1 | 9/2012 | Reinert |

(Continued)

FOREIGN PATENT DOCUMENTS

JP 2018111986 A * 7/2018

OTHER PUBLICATIONS https://www.thecameraarm.com/; The Camera Arm Website; Dec. 29, 2020.

(Continued)

*Primary Examiner* — Rebecca A Volentine
(74) *Attorney, Agent, or Firm* — Neustel Law Offices

(57) ABSTRACT

A camera system for a trailer that cooperates with a tarping system of the trailer to capture images during loading and unloading. The camera transmits the images to a display. A driver may watch the display to monitor loading and unloading. The camera system maintains a camera of the camera system positioned to capture images of an interior of the trailer regardless of the operation of the tarping system. The camera system generally includes an arm member, a pivot structure connected to the arm member, a camera connected to the arm member, and a weight connected to the arm member. Responsive to a force of gravity the camera remains oriented upward to capture images of the interior of the trailer during loading and unloading.

20 Claims, 15 Drawing Sheets

(56) References Cited

U.S. PATENT DOCUMENTS

2012/0265369 A1  10/2012  Knight
2016/0314357 A1  10/2016  Fey
2017/0370765 A1  12/2017  Meier
2020/0279377 A1   9/2020  Gabel

OTHER PUBLICATIONS https://www.farmshow.com/a_article_print.php?aid=26300; "Dual Cameral System Mounts on Semi Trailer"; Farm Show Magazine, vol. #37, Issue #1, Page #11; 2013.

* cited by examiner

CAMERA SYSTEM FOR PARTICULATE MATERIAL TRAILER

CROSS REFERENCE TO RELATED APPLICATIONS

The present application is a continuation of U.S. application Ser. No. 17/226,494 filed on Apr. 9, 2021 which issues as U.S. Pat. No. 11,066,023 on Jul. 20, 2021. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a camera system for a trailer that provides loading and unloading status.

Related Art

Any discussion of the related art throughout the specification should in no way be considered as an admission that such related art is widely known or forms part of common general knowledge in the field.

Tarping systems are used to cover the opening of a trailer, in particular a trailer hauling particulate material (e.g., gravel, sand, grain, dirt), so that the cargo does not exit the trailer during transit. Cameras have been mounted on trucks so a driver may observe the loading or unloading of the cargo area of a truck while the driver is seated in the cabin of the truck. However, a camera mounted on a trailer with a tarping system interferes with movement of the tarping system. Interference of the camera with the tarping system may be overcome by mounting the camera on the trailer after the tarping system has removed the tarp from the trailer and removing the camera from the trailer before the tarping system replaces the tarp over the trailer. However, mounting and unmounting the camera is inconvenient.

There is a need for a new and improved camera system that can cooperate with a tarping system and that positions the camera of the camera system to monitor loading and unloading of a trailer.

SUMMARY

A camera system for a trailer that cooperates with a tarping system of the trailer to capture images during loading and unloading. The camera transmits the images to a display. A driver may watch the display to monitor loading and unloading. The camera system maintains a camera of the camera system positioned to capture images of an interior of the trailer regardless of the operation of the tarping system. The camera system generally includes an arm member, a pivot structure connected to the arm member, a camera connected to the arm member, and a weight connected to the arm member. Responsive to a force of gravity the camera remains oriented upward to capture images of the interior of the trailer during loading and unloading.

There has thus been outlined, rather broadly, some of the embodiments of the camera system for a trailer in order that the detailed description thereof may be better understood, and in order that the present contribution to the art may be better appreciated. There are additional embodiments of the camera system for a particulate material trailer that will be described hereinafter and that will form the subject matter of the claims appended hereto. In this respect, before explaining at least one embodiment of the camera system for a trailer in detail, it is to be understood that the camera system for a trailer is not limited in its application to the details of construction or to the arrangements of the components set forth in the following description or illustrated in the drawings. The camera system for a trailer is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus do not limit the example embodiments herein.

DETAILED DESCRIPTION

A. Overview

Figure 1:
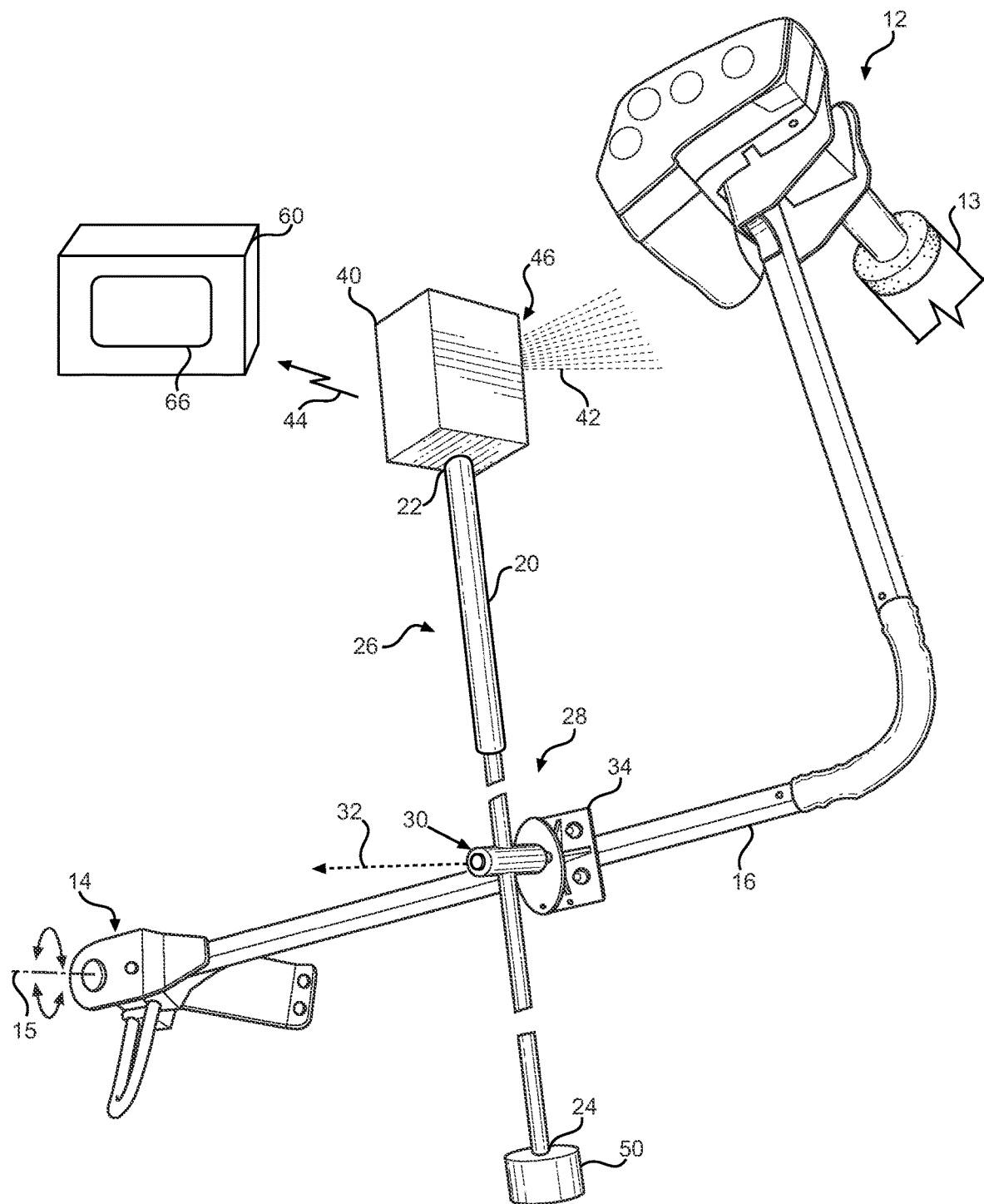
FIG. 1 is a perspective view of a camera system for a trailer, in accordance with an example embodiment, attached to a movable arm of a tarping system.
Figure 2:
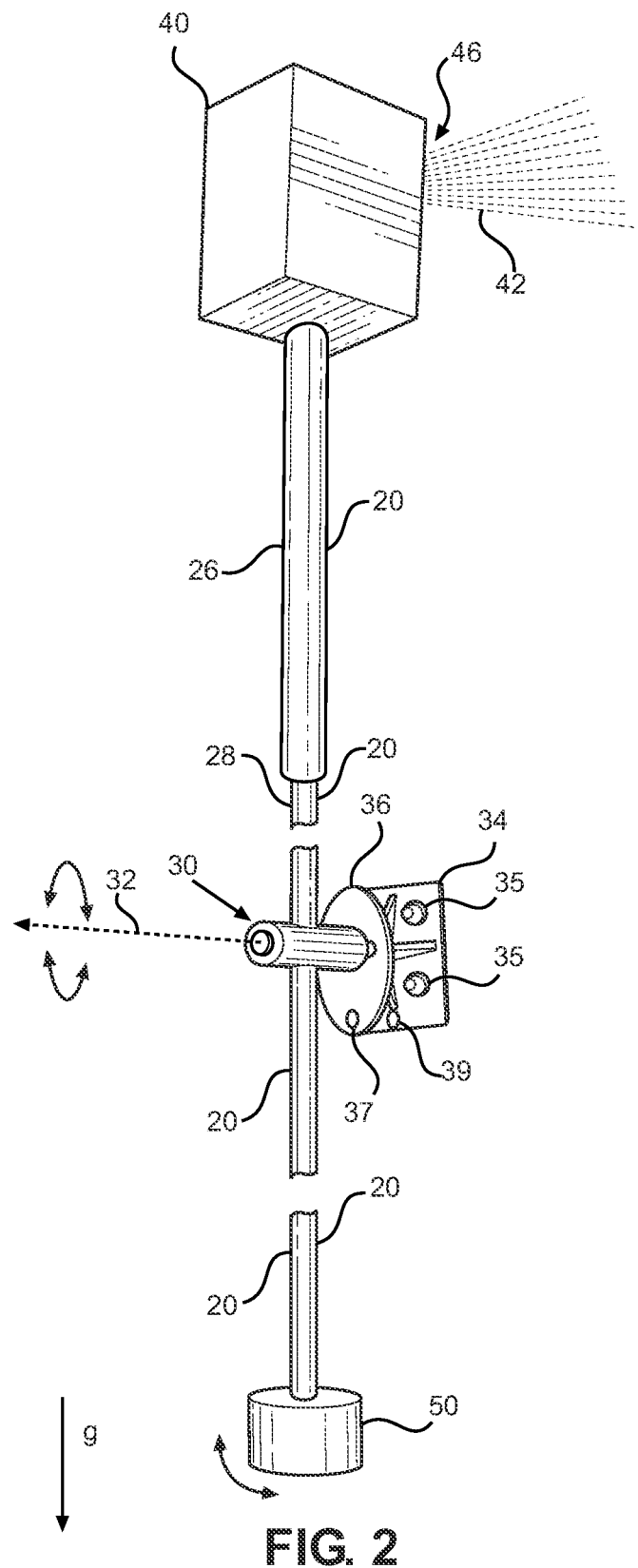
FIG. 2 is a perspective view of the example embodiment.
Figure 3:
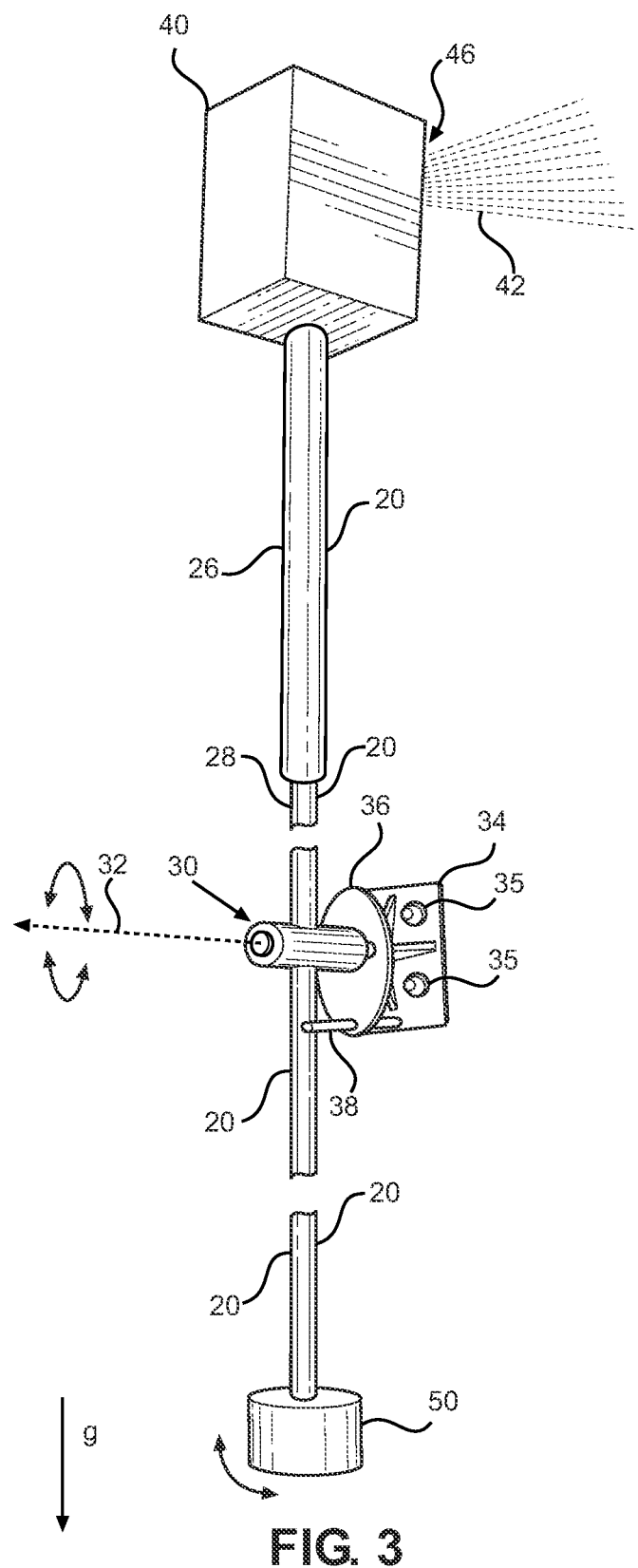
FIG. 3 is a perspective view of the example embodiment held in a stowed position by a locking mechanism.

An example embodiment of the camera system for a trailer generally comprises an arm member 20, a pivot structure 30, a camera 40 and a weight 50. The arm member 20 has a first end 22 and a second end 24. The pivot structure 30 is connected to the arm member 20 between the first end 22 and the second end 24. The pivot structure 30 pivotably supports the arm member 20 about a pivot axis 32. The pivot structure 30 is adapted to attach to a movable arm 16 of a tarping system 12. The tarping system 12 is attached to a trailer 10. The trailer 10 may be connected to a tractor 18. The tractor 18 includes a cabin where an operator sits to operate the tractor 18. The tractor 18 connects to the trailer 10. The tractor 18 may move (e.g., haul, pull, push, move forward, move backwards) the trailer 10. The camera 40 is connected to the arm member 20 at a first position between the pivot structure 30 and the first end 22 of the arm member 20. The weight 50 is connected to the arm member 20 at a second position between the pivot structure 30 and the second end 24 of the arm member 20. Responsive to a force of gravity on the weight 50, the arm member 20 rotates about the pivot axis 32 to orient the weight 50 downward and the camera 40 upward with respect to the force of gravity. The force of gravity acting on the weight 50 orients the weight 50 downward and the camera 40 upward regardless of the orientation of the movable arm 16. Orienting the camera 40 upward enables the camera 40 to capture images of an interior of the trailer 10. The camera 40 may transmit captured images to a display 60 for presentation on a screen 66 of the display 60. The driver of the tractor 18 may view the images presented on the screen 66 of the display 60 to monitor loading or unloading of cargo into and from the trailer 10. Responsive to the images of the cargo, the driver may move the trailer 10 using the tractor 18 to facilitate loading or unloading. The trailer 10 may be loaded with any type of cargo, but in particular with particulate material (e.g., gravel, grain, sand, dirt).

B. Arm Member

Generally, the arm member 20, as best shown in in FIGS. 1-4, comprises a first end 22 and a second end 24. The arm member 20 pivotably connects (e.g., couples) to the pivot structure 30 at a point between the first end 22 and the second end 24. The arm member 20 connects to the pivot structure 30 such that the pivot structure 30 supports the arm member 20 so that the arm member 20 freely rotates around the pivot axis 32 of the pivot structure 30. The arm member 20 further connects to the camera 40 and the weight 50, so the pivot structure 30 supports the arm member 20 along with the camera 40 and the weight 50. The arm member 20 freely rotates around pivot axis 32 while the camera 40 and the weight 50 are coupled thereto.

The length of the arm member 20 between the pivot structure 30 and the first end 22 of the arm member 20 may be adjustable. Adjusting the length of the arm member 20 includes extending and retracting at least a portion of the arm member 20 between the pivot structure 30 and the first end 22 to lengthen and shorten respectively the length of the arm member 20. The arm member 20 between the pivot structure 30 and the first end 22 may generally include a first segment 26 and a second segment 28. The first segment 26 may move relative to the second segment 28 to adjust the length of the arm member 20 between the pivot structure 30 and the first end 22. Movement of the first segment 26 relative to (e.g., with respect to) the second segment 28 may include a telescopic movement of the first segment 26 relative to the second segment 28. In another embodiment, the first segment 26 rotates with respect to second segment 28 to move along threads on the first segment 26 and on the second segment 28 to extend or retract to lengthen or shorten respectively the length of the arm member 20 between the pivot structure 30 and the first end 22.

The arm member 20 may connect to the pivot structure 30 at any point along the length of the arm member 20 between the first end 22 and the second end 24. Preferably, the arm member 20 connects to the pivot structure 30 at a point where the length of the arm member 20 between the pivot structure 30 and the first end 22 is greater than the length of the arm member 20 between the pivot structure 30 and the second end 24. Preferably, after the length of the arm member 20 has been adjusted, the length of the arm member 20 between the pivot structure 30 and the first end 22 is greater than the length of the arm member 20 between the pivot structure 30 and the second end 24.

Because the camera 40 is connected to the first end 22 of the arm member 20, lengthening the arm member 20 moves the camera 40 further away from the pivot structure 30. Whereas, shortening the arm member 20 moves the camera 40 closer to the pivot structure 30. Adjusting the length of the arm member 20 may be performed to position the camera 40 above an upper edge of the trailer 10, so the camera 40 may capture images of an interior of the trailer 10.

In an embodiment, the length of the arm member 20 between the pivot structure 30 and the second end 24 is not adjustable, so the distance between the weight 50 and the pivot structure 30 is fixed. However, in another embodiment, the length of the arm member 20 between the pivot structure 30 and the second end 24 is adapted to be adjustable, thereby enabling the weight 50 to be positioned closer to or further away from the pivot structure 30.

The arm member 20 may be formed of any type of material. For example, the arm member 20 may be formed of metal, plastic, a composite material (e.g., reinforced plastics, metal matrix composite), wood, or any combination thereof. Preferably, the arm member 20 is formed of metal. The arm member 20 may have any cross-section. For example, the arm member 20 may have a round cross-section, a square cross-section, a rectangular cross-section, a triangular cross-section, an I-shaped cross-section, a T-shaped cross-section, an L-shaped cross-section or any combination thereof. The structure of the arm member 20 may be hollow, solid or a combination of solid and hollow. Preferably, the arm member 20 is formed of a metal tube having a round cross-section. In another embodiment, the arm member 20 may be formed of angle iron having an L-shaped cross-section. In another embodiment, the arm member 20 may be formed of a metal tube having a square cross-section.

The arm member 20 may connect to the pivot structure 30 in any manner. The arm member 20 may be mechanically coupled (e.g., bolts, screws, tape) to the pivot structure 30. The arm member 20 may be chemically coupled (e.g., glued) to the pivot structure 30. The arm member 20 may be welded to the pivot structure 30. In an embodiment, the arm member 20 is formed of a metal tube and is welded to the pivot structure 30.

The arm member 20 may include any structure for adjusting the length of the arm member 20 between the pivot structure 30 and the first end 22. As discussed above, the arm member 20 between the pivot structure 30 and the first end 22 may include the first segment 26 and the second segment 28. The first segment 26 and the second segment 28 may include any structure for adjusting the length of the arm member 20. For example, the first segment 26 and the second segment 28 may be tubes of different diameters so that the first segment 26 may be nested outside the second segment 28. The first segment 26 may move (e.g., slide, telescope) along the length of the second segment 28 while retaining the second segment 28 inside of its interior. Once the first segment 26 has been moved to a desired position relative to the second segment 28, the first segment 26 may be removably coupled to the second segment 28. Removably coupling the first segment 26 to the second segment 28 may be accomplished in any manner, for example, mechanically, using a clamp, friction, a cotter pin, a peg (e.g., pin, bolt) position through aligned holes in the first segment 26 and the second segment 28, and/or threads. Removably coupling the first segment 26 to the second segment 28 establishing the length of the arm member 20 between the pivot structure 30 and the first end 22. Coupling the first segment 26 to the second segment 28 further couples the first segment 26 to the pivot structure 30.

In another embodiment, the first segment 26 and the second segment 28 may be formed of flat iron with numerous holes along the respective lengths thereof. The holes of the first segment 26 align with the holes of the second segment 28. The second segment 28 couples to the pivot structure 30. The first segment 26 may be moved with respect to the second segment 28 to establish the length of the arm member 20 between the pivot structure 30 and the first end 22. Once the length has been established, a bolt, or other fastener, may be placed through the aligned holes of the first segment 26 and the second segment 28 to fix the position of the first segment 26 with respect to the second segment 28, thereby establishing the length of the arm member 20 between the pivot structure 30 and the first end 22. Coupling the first segment 26 to the second segment 28 couples the first segment 26 to the pivot structure 30.

C. Pivot Structure

The pivot structure 30, as best shown in in FIGS. 1-4, rotates about the pivot axis 32. The pivot structure 30 supports the arm member 20 such that the arm member 20 rotates around the pivot axis 32. The pivot structure 30 is adapted to attach (e.g., couple, connect) to a movable arm 16 of a tarping system 12. The pivot structure 30 is adapted to attach to the movable arm 16 at any position along the length of the movable arm 16. While the pivot structure 30 is attached to the movable arm 16, the arm member 20 rotates around the pivot axis 32 relative (e.g., with respect) to the movable arm 16. While the pivot structure 30 is attached to the movable arm 16 of the tarping system 12, the movable arm 16 supports the arm member 20, everything connected to the arm member 20, and the pivot structure 30, and everything associated with the pivot structure 30.

The pivot structure 30 may further include a mount 34, as best shown in FIGS. 1-4. The mount 34 is adapted to removably couple the pivot structure 30 to the movable arm 16. The mount 34 may removably couple the pivot structure 30 to the movable arm 16. While the mount 34 of the pivot structure 30 is attached to the movable arm 16, the arm member 20 rotates around the pivot axis 32 relative to the mount 34 and to the movable arm 16. The mount 34 is adapted to removably attach to the movable arm 16 at any position along the length of the movable arm 16.

Figure 4:
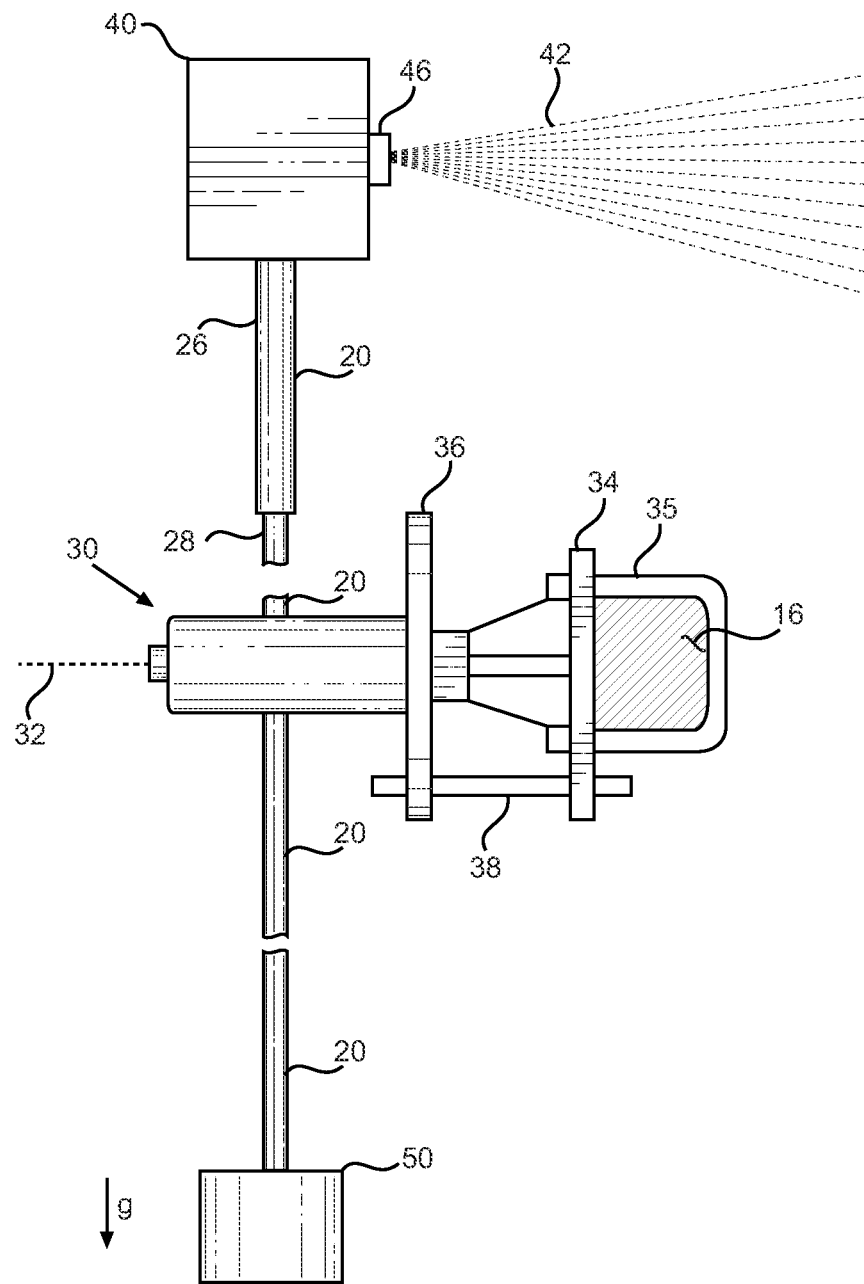
FIG. 4 is a side view of the example embodiment with a cross-section of a movable arm of the tarping system.
Figure 5:
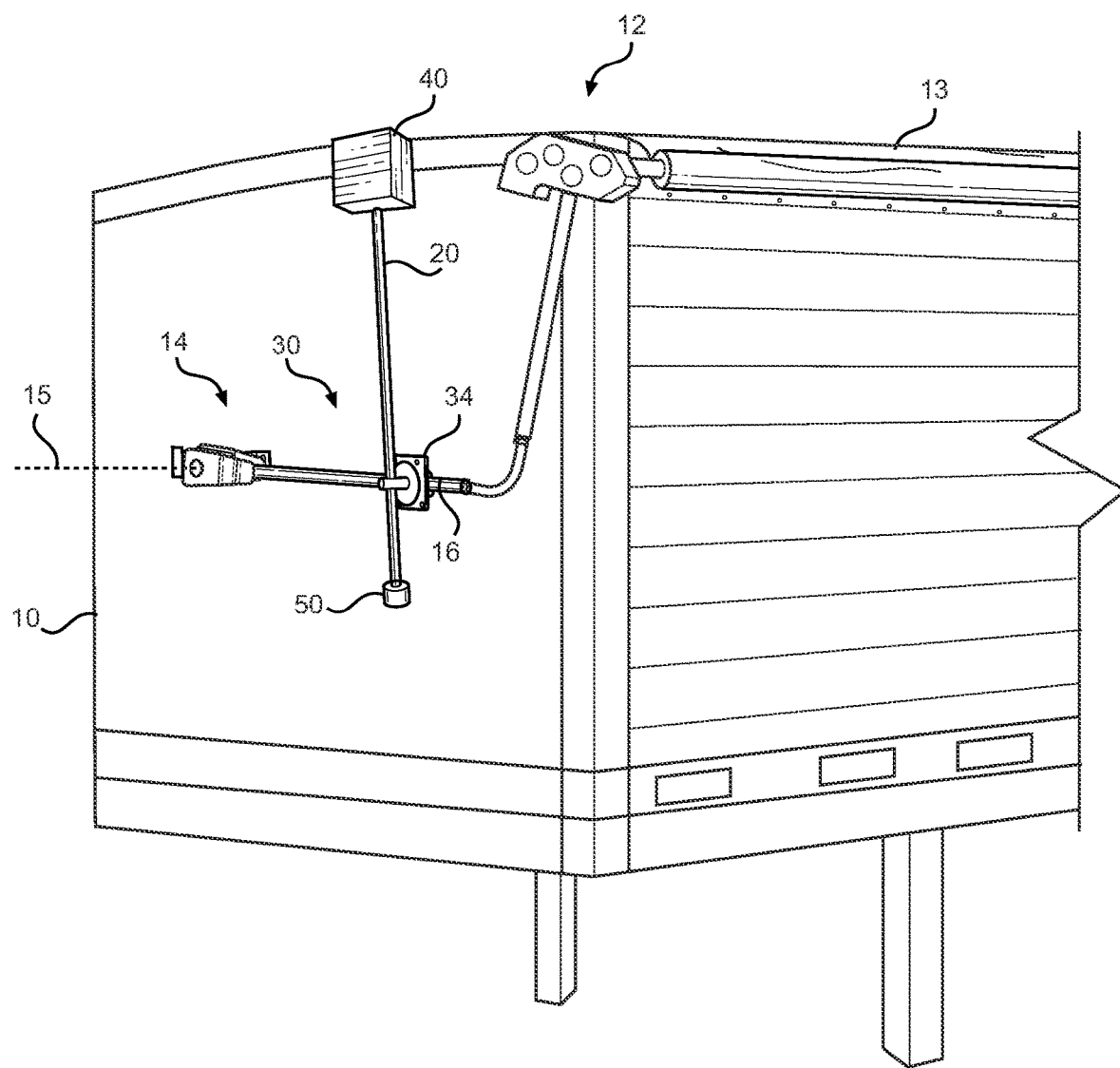
FIG. 5 is a perspective view of the example embodiment attached to the movable arm of the tarping system and while a tarp of the tarping system is in a closed position.

Any type of removable coupling mechanism may be used to removably couple the mount 34 to the movable arm 16. For example, as best seen in FIG. 4, the pivot structure 30 may include one or more U-bolts 35 for removably coupling the mount 34 to the movable arm 16. The mount 34 may include two or more holes through which the one or more U-bolts 35 may be inserted. The one or more U-bolts 35 may be positioned around the movable arm 16 and the ends of the one or more U-bolts 35 inserted through the holes of the mount 34. Bolts may be screwed on to the ends of the one or more U-bolts 35 to removably attach the mount 34 to the movable arm 16. The one or more U-bolts 35 may be used to attach mount 34 to the movable arm 16 at any point (e.g., position) along a length of the movable arm 16. In the event that adjustment is needed, the bolts of the one or more U-bolts 35 may be loosened to move the mount 34 to any position along the length of the movable arm 16.

The pivot structure 30 may further include a plate 36. The plate 36 couples to the portion of the pivot structure 30 that pivotably supports the arm member 20. The plate 36 rotates with the pivot structure 30 and with the arm member 20 with respect to the mount 34 and the movable arm 16. While the mount 34 is attached to the movable arm 16, the plate 36 also rotates with respect to the mount 34 and the movable arm 16.

The pivot structure 30 may further include a locking mechanism 38. The locking mechanism 38 removably couples to the plate 36 and to the mount 34. While the locking mechanism 38 is coupled to the plate 36 and to the mount 34, the locking mechanism 38 fixedly couples the plate 36 to the mount 34 whereby the locking mechanism 38 stops the rotation of the plate 36, the pivot structure 30, and the arm member 20 with respect to the mount 34 and the movable arm 16.

The locking mechanism 38 may include any structure suitable for coupling to the plate 36 and to the mount 34 to stop movement between the plate 36 and the mount 34. For example, the locking mechanism 38 may be a clamping device that clamps between the plate 36 and the mount 34 to stop movement between the plate 36 and the mount 34. In another example, the plate 36 and the mount 34 may include a hole 37 and 39 respectively. The locking mechanism 38 may include any type of device capable of being inserted into the hole 39 of the plate 36 and the hole 39 of the mount 34 to stop movement between the plate 36 and the mount 34. For example, a bolt (e.g., rod, wire, bar) may be inserted through the holes 37 and 39 of the plate 36 and the mount 34. The rigidity (e.g., stiffness) of the bolt stops movement between the plate 36 and the mount 34. In another example, a padlock may be inserted into the holes 37 and 39 of the plate 36 and of the mount 34 to stop movement between the plate 36 and the mount 34. A locking mechanism that comprises a padlock further provides security against theft of the camera system.

The pivot structure 30 may generally comprise a fixed portion and a rotating portion. A central axis of the fixed portion is aligned with (e.g., along) the pivot axis 32. A central axis of the rotating portion is aligned with the pivot axis 32. The rotating portion rotates around the central axis of the fixed portion and thereby around the pivot axis 32. The arm member 20 connects to the rotating portion of the pivot structure 30. The rotating portion may include one or more bearings. The fixed portion may couple to the interior or the exterior of the one or more bearings while the rotating portion may couple to the exterior or interior respectively of the one or more bearings. A central axis of the one or more bearings is aligned with the pivot axis 32. The fixed portion is adapted to removably attach to the movable arm 16 of the tarping system 12. The fixed portion is adapted to removably attach to the movable arm 16 at any position along a length of the movable arm 16. The mount 34 of the pivot structure 30 may couple to the fixed portion for removably coupling the fixed portion to the movable arm 16. The plate 36 may be attached to the rotating portion of the pivot structure 30. While the locking mechanism 38 is attached to the plate 36 and the mount 34, the rotating portion of pivot structure 30 does not rotate relative to the fixed portion. In an implementation, the fixed portion is a pin (e.g., bar, shaft) and the rotating portion is a sleeve (e.g., tube) that rotates around the pin and the pivot axis 32. In another implementation, the fixed portion is a first tube having a first diameter and the rotating portion is a second tube having a second diameter. The second diameter is greater than the first diameter so that the first tube may be positioned inside the second tube so the second tube rotates around the first tube and around the pivot axis 32.

D. Camera

Generally, the camera 40, as best shown in in FIGS. 1-15, comprises a lens 46, a processing circuit 45, and a transceiver 48. The camera 40 is connected to the arm member 20 at a first position between the pivot structure 30 and the first end 22 of the arm member 20. In an embodiment, the first position where the camera 40 is connected to the arm member 20 is at or near the first end 22 of the arm member 20.

The transceiver 48 of the camera 40 includes a transmitter. The camera 40 captures and transmits via the transmitter one or more images to a display 60. The camera 40 may capture the images while the tarp 13 is in the open position, so the images show an interior the trailer 10 and provide information as to the status of unloading or loading a cargo. The display 60 may be positioned in the cabin of the tractor 18, which is connected to the trailer 10. The display 60 may present the one or more images captured by the camera 40 to the driver to provide the status of loading or unloading to the driver.

In an implementation, camera 40 is connected to the first segment 26 so that a change in the length of the arm member 20 between the pivot structure 30 and the first end 22 changes a height (e.g., distance) of the camera 40 relative to the pivot structure 30. The height of the camera 40 with respect to (e.g., above) the pivot axis 32 preferably positions the camera 40 above an upper edge of the trailer 10 such that the camera 40 may capture one or more images of an interior of the trailer 10. Preferably, the height of camera 40 positions the camera 40 above the upper edge of trailer 10 while the tarp of the tarping system is in the open position.

The lens 46 establishes a field-of-view 42 of the camera 40. The camera 40 may capture one or more images within the field-of-view 42. The camera 40 may transmit one or more images captured in the field-of-view 42. The field-of-view 42 may be oriented toward the trailer 10 such that the field-of-view 42 includes (e.g., covers, encompasses) the trailer 10. While the tarp 13 is in the open position, the field-of-view 42 may cover the opening of the trailer 10, so the camera 40 may capture images of an interior of the trailer. Capturing images of an interior of the trailer provide information as to a status of the cargo (e.g., load) in the trailer 10. The camera 40 may capture and transmit one or more images of the interior of the trailer 10 while the interior of the trailer 10 is within the field-of-view 42. To capture images of the interior of the trailer 10, the camera 40 is positioned above an upper edge of the trailer 10 and the tarp 13 is in the open position.

The lens 46 may generally comprise optics and a charged coupled device for converting light that enters the optics into digital images. The camera 40 may be a still camera that captures one or more images within the field-of-view 42. The camera may be a video camera that captures a plurality of sequential images (e.g., a video) within the field-of-view 42. The processing circuit 45 controls the functions of the camera 40, such as capturing the one or more images, focusing the lens 46 within the field-of-view, storing captured images, transmitting the captured images, and any other function performed by the camera 40.

The transceiver 48 transmits and receives (e.g., communicates) information (e.g., data). The transceiver 48 may include a transmitter and a receiver. A transmitter transmits (e.g., sends) information. A receiver receives information. The transceiver 48 may transmit and/or receive information via a communication link 44. A transmitter may transmit information via the communication link 44. A receiver may receive information via the communication link 44. For example, the transmitter of the transceiver 48 may transmit via the communication link 44 the one or more images captured by the camera 40 in the field-of-view 42. The processing circuit 45 may receive the one or more images from the lens 46 and provide the one or more images to the transmitter of the transceiver 48 for transmission. Any suitable device may receive the information transmitted by transceiver 48 via the communication link 44. The communication link 44 may be wired or wireless. The transceiver 48 may include a wireless transmitter and a wireless receiver for transmitting and receiving information via a communication link 44 that is wireless. The transceiver 48 may include a wired transmitter and a wired receiver for transmitting and receiving information via a communication link 44 that is wired. In an implementation, the camera 40 includes only a wired or wireless transmitter. In another implementation, the camera 40 includes a wired or wireless transceiver. The transceiver 48 may use any conventional communication protocol for transmitting and/or receiving via the communication link 44. For example, the transceiver 48 may use Wi-Fi, Bluetooth, ZigBee, 3G, 4G, 5G, Ethernet, and/or vehicle-oriented controller area network ("CAN") protocols.

The camera 40 may be connected to the arm member 20 in any suitable manner. In an implementation, a housing that holds the camera 40 is welded at or near the first end 22. In another implementation, the first end 22 is inserted into a hole of the housing of camera 40 and secured thereto. In another implementation, camera 40 removably couples to threads at first end 22.

E. Weight

Generally, the weight 50, as best shown in in FIGS. 1-4, comprises an object having a mass. The weight 50 is connected to the arm member 20 at a second position between the pivot structure 30 and the second end 24 of the arm member 20. In an embodiment, the second position where the weight 50 is connected to the arm member 20 is at or near the second end 24.

A force of gravity acts on (e.g., pulls on, attracts) the arm member 20, the camera 40 and the weight 50. The mass of weight 50 establishes a center of gravity of the arm member 20 and the camera 40 below the pivot axis 32. The mass of weight 50 may be sufficient such that the center of gravity is established below the pivot axis 32, whereby responsive to the force of gravity, the arm member 20 rotates on the pivot axis 32 to orient the weight 50 downward (e.g., closer to the ground) and the camera 40 upward (e.g., further away from the ground) with respect to (e.g., with reference to) the force of gravity. To facilitate the rotation of the arm member 20 to orient the weight 50 downward and the camera 40 upward, the mass of the weight 50 may be sufficient to establish a center of gravity of the arm member 20 in combination with the camera 40 below the pivot axis 32 (e.g., closer to the weight 50). In other words, the mass of the weight 50 may be sufficient to establish the center of gravity at a point along or near the arm member 20 between the pivot structure 30 and the second end 24, preferably at or near the second end 24, or at or near the center of the weight 50. When the mass of the weight 50 is sufficient to establish the center of gravity below the pivot axis 32, the force of gravity on the weight 50 counteracts (e.g., counterbalances) the force of gravity on the mass of the arm member 20, the distance between the pivot axis 32 and the camera 40, and the mass of the camera 40 to rotate the arm member 20 about the pivot axis 32 to position the camera 40 upward and the weight 50 downward with respect to gravity.

Because the weight 50, responsive to a force of gravity, orients the camera 40 upward, the camera 40 is positioned to capture one or more images of an interior of the trailer 10. Because the pivot structure 30 removably couples to the movable arm 16, movement of the movable arm 16 affects the orientation (e.g., angular orientation, rotational orientation) of the pivot structure 30 thereby requiring the arm member 20 to rotate about the pivot axis 32 to maintain the camera 40 positioned upward.

When the mass of the weight 50 is sufficient to establish the center of gravity of the camera system below the pivot axis 32, the position of the arm member 20 is at equilibrium (e.g., a position of equilibrium, an orientation of equilibrium) when the weight 50 is oriented downward and the camera 40 upward with respect to gravity. When the pivot structure 30 (e.g., the fixed portion) rotates in one direction (e.g., clockwise), the arm member 20, responsive to the force of gravity, rotates around the pivot axis 32 in the opposite direction (e.g., counterclockwise), to remain in its position of equilibrium. As the arm member 20 rotates out of its position of equilibrium, the force of gravity acting on the weight 50 applies a torsion force to the arm member 20 return it to its position of equilibrium. The force of gravity continually operates on the weight 50, and also the arm member 20 and the camera 40, to maintain the arm member 20 in its position of equilibrium where the camera 40 is oriented upward.

The weight 50 may include any object having a suitable mass. For example, the weight 50 may include a piece of metal (e.g., solid), sand in a bag, concrete, or a block of wood.

The weight 50 may be connected to the arm member 20 in any suitable manner. Any type of fastener may be used to mechanically couple the weight 50 to the arm member 20. Preferably, the weight 50 is fixed to the arm member 20 and cannot be removed; however, in an implementation, the weight 50 is removably coupled to the arm member 20.

F. Display

A display, as best shown in FIGS. 1, 8, and 12-15, generally comprises a transceiver 62, a processing circuit 64 and a screen 66. The transceiver 62 transmits and receives information. The transceiver 62 may include a transmitter and a receiver. The transmitter of the transceiver 62 may transmit information and the receiver of the transceiver 62 may receive information via the communication link 44. The transceiver 62 may use any conventional communication protocol as discussed above with respect to transceiver 48. A display 60 may be a separate electronic device or a device that is incorporated into another electronic device. For example, the display 60 may be incorporated into a tablet, a smart phone, or a computer. The display 60 may be part of an in-vehicle electronic system. A display 60 may be positioned on a dashboard of a vehicle (e.g., tractor 18) for observation by a driver of the vehicle.

The receiver of the transceiver 62 may receive one or more images from the camera 40 via the communication link 44. The processing circuit 64 may receive the one or more images from the transceiver 62 and provide the one or more images to the screen 66 for display. The screen 66 may include any type of a screen or monitor for presenting visual and/or graphic information. The screen may present still images and or video images.

G. Trailer

A trailer 10, as shown in FIGS. 5-7 and 9-14, hauls (e.g., carries) a cargo. One type of cargo is particulate material, such as gravel, that pours into the trailer 10 during loading and pours out of the trailer 10 during unloading. During loading of a cargo, hauling, or unloading of the cargo, the trailer 10 is coupled to and moved around by the tractor 18. The trailer 10 moves responsive to the force provided by the tractor 18. The tractor 18 includes a cabin for the driver sits to operate the tractor. The trailer 10, especially for a trailer that hauls particulate material, includes a tarping system 12. The tarping system 12 generally comprises a tarp 13, a pivot structure 14, a pivot axis 15 and a movable arm. The tarping system 12 is connected to the trailer and moves the tarp 13 over the top of the trailer to cover it and off the top of the trailer to uncover it.

Figure 9:
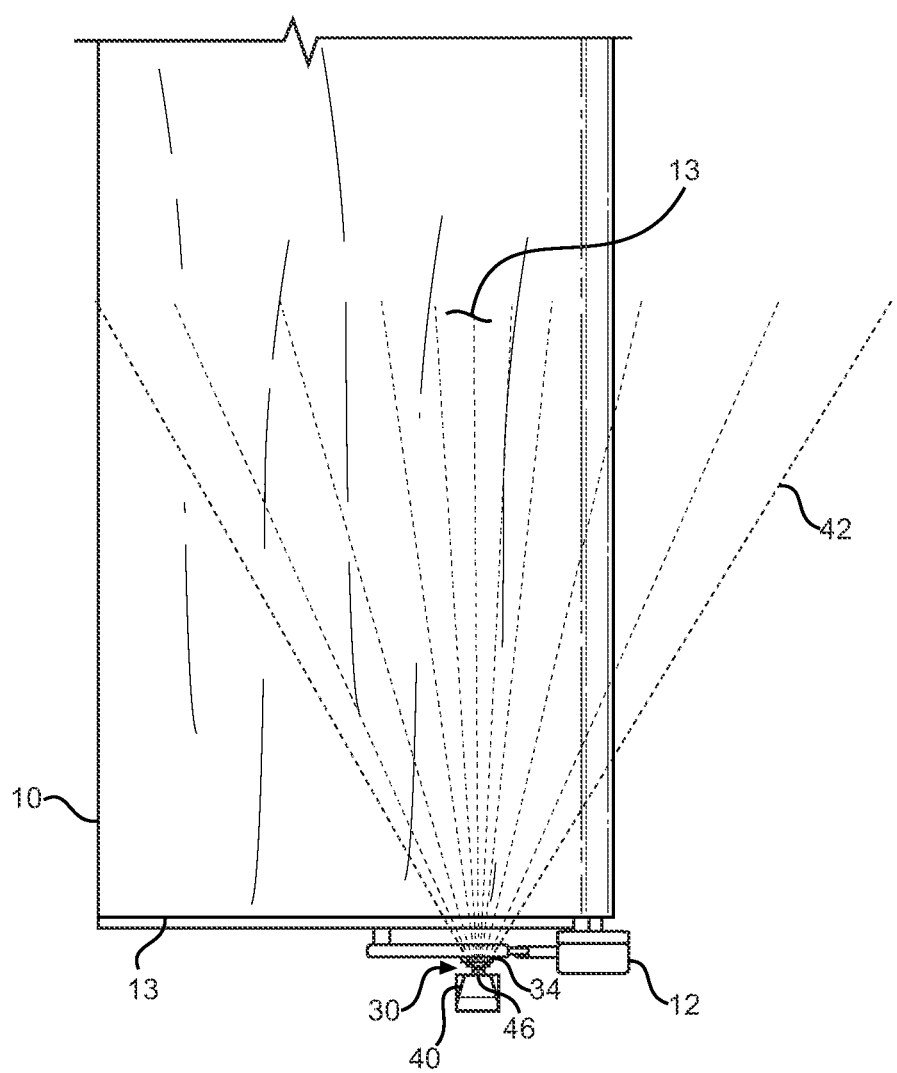
FIG. 9 is a top view of the example embodiment attached to the movable arm of the tarping system and while the tarp is in the closed position
Figure 10:
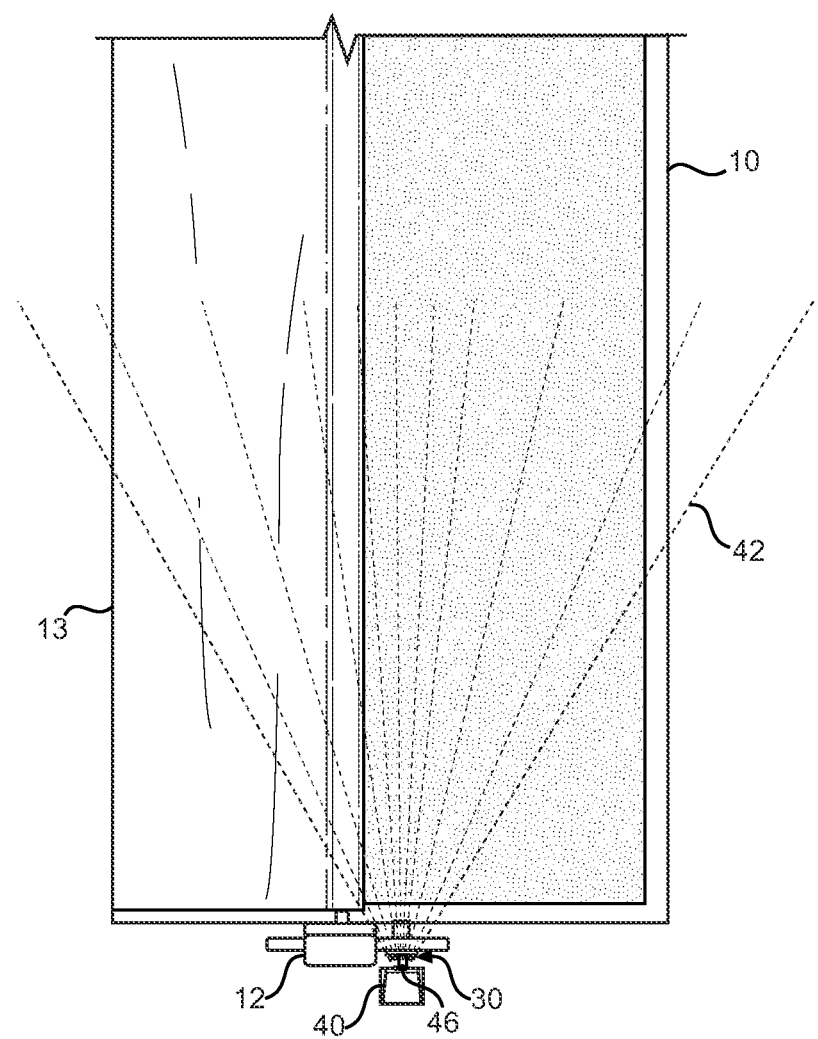
FIG. 10 is a top view of the example embodiment attached to the movable arm of the tarping system and while the tarp is in the intermediate position.
Figure 11:
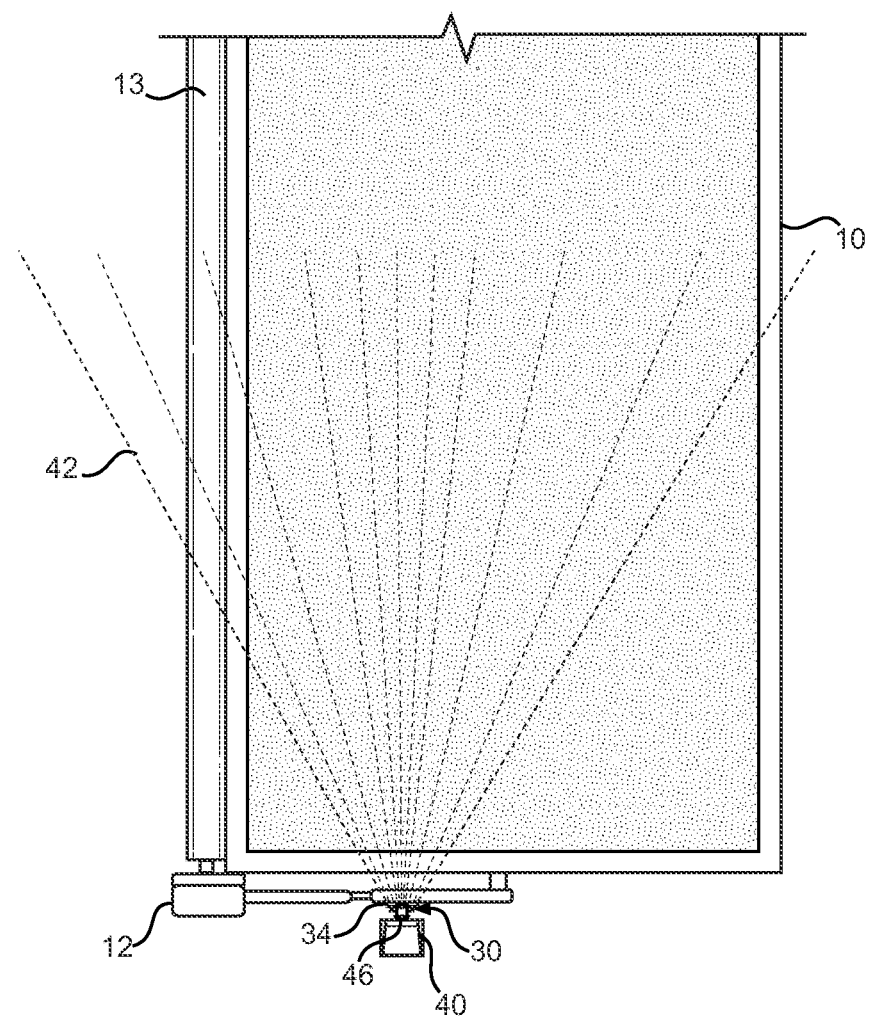
FIG. 11 is a top view of the example embodiment attached to the movable arm of the tarping system and while the tarp is in the open position.
Figure 12:
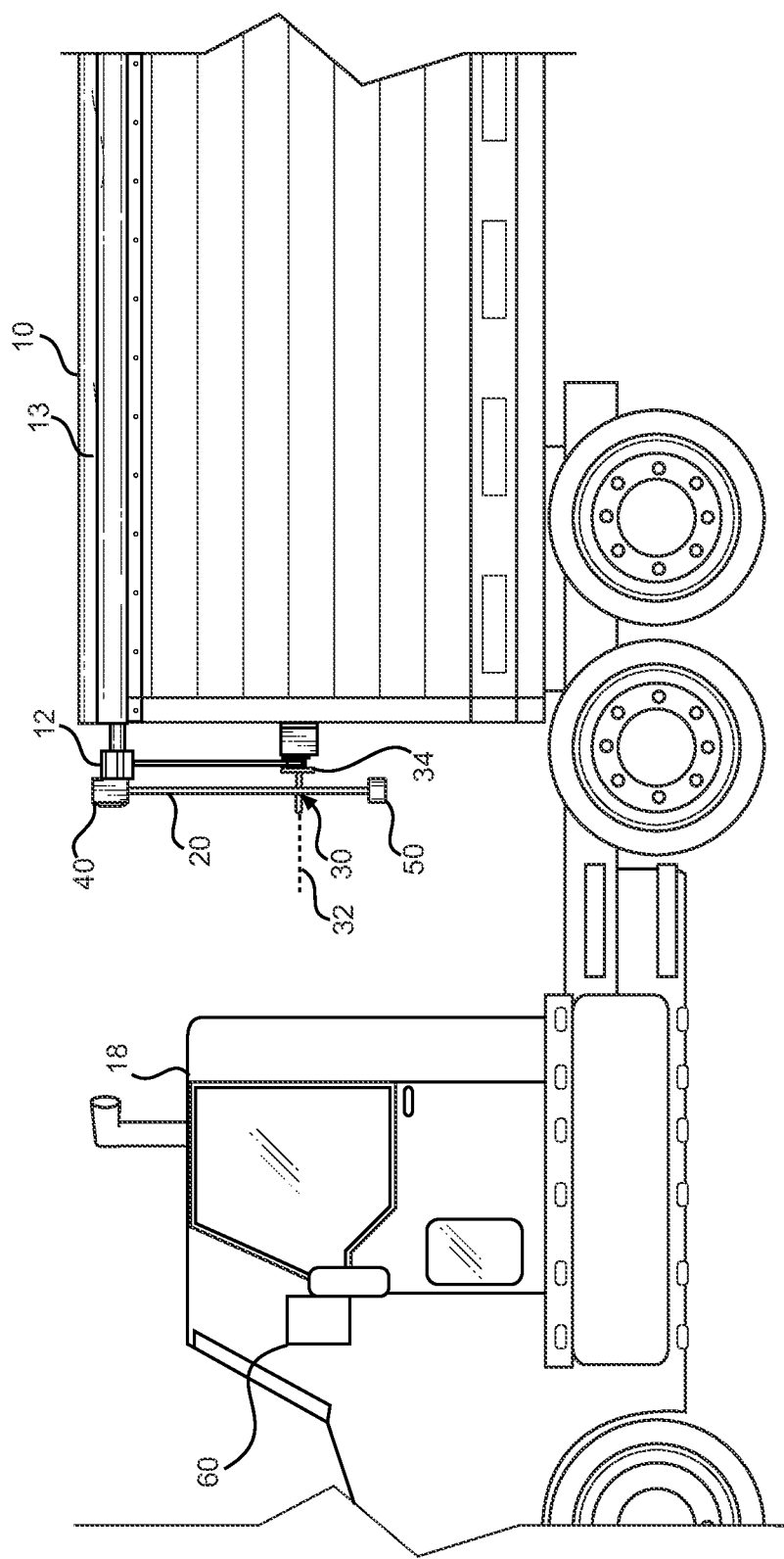
FIG. 12 is a side view of the example embodiment attached to the movable arm of the tarping system and while the tarp is in the closed position
Figure 13:
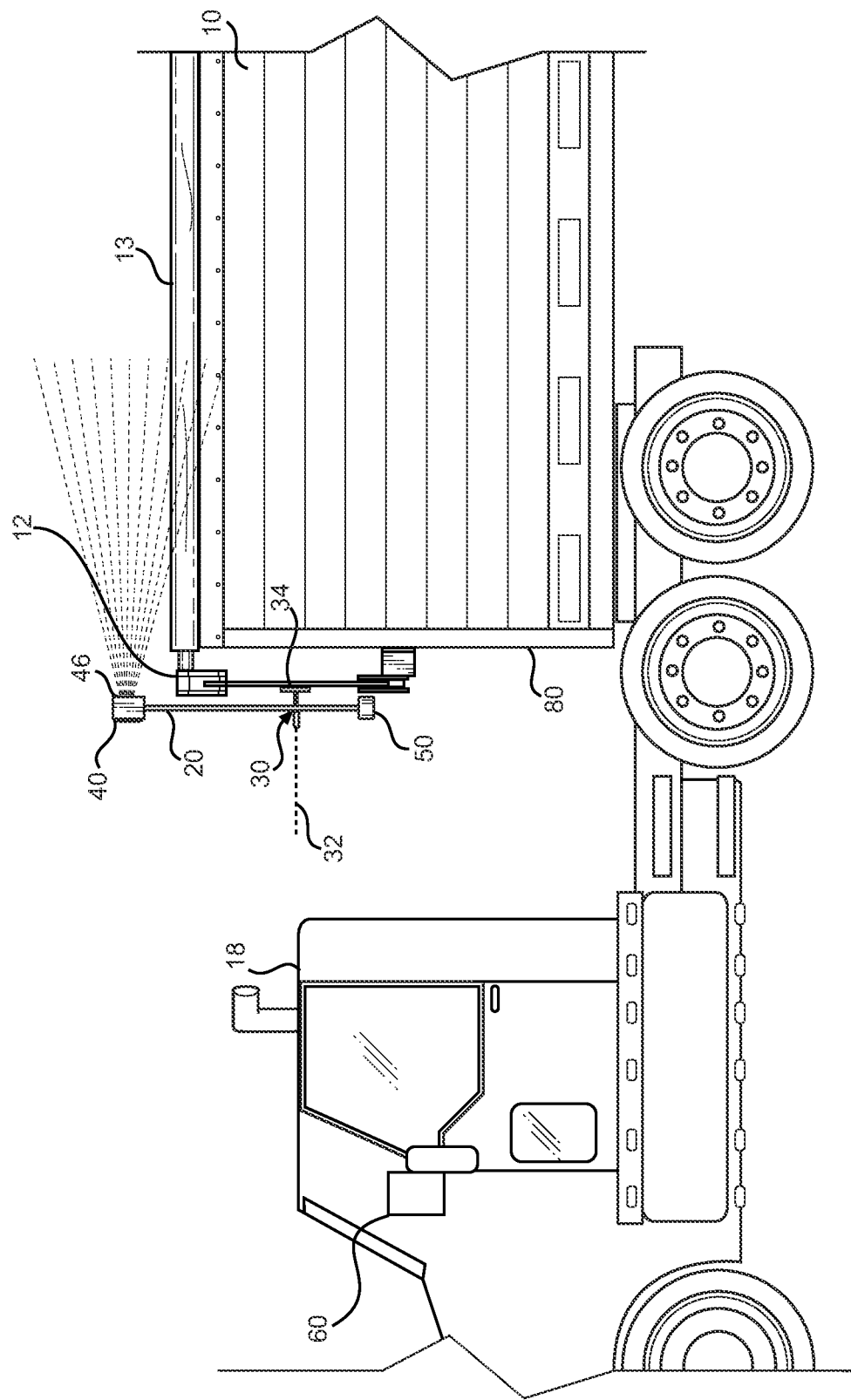
FIG. 13 is a side view of the example embodiment attached to the movable arm of the tarping system and while the tarp is in the intermediate position.
Figure 14:
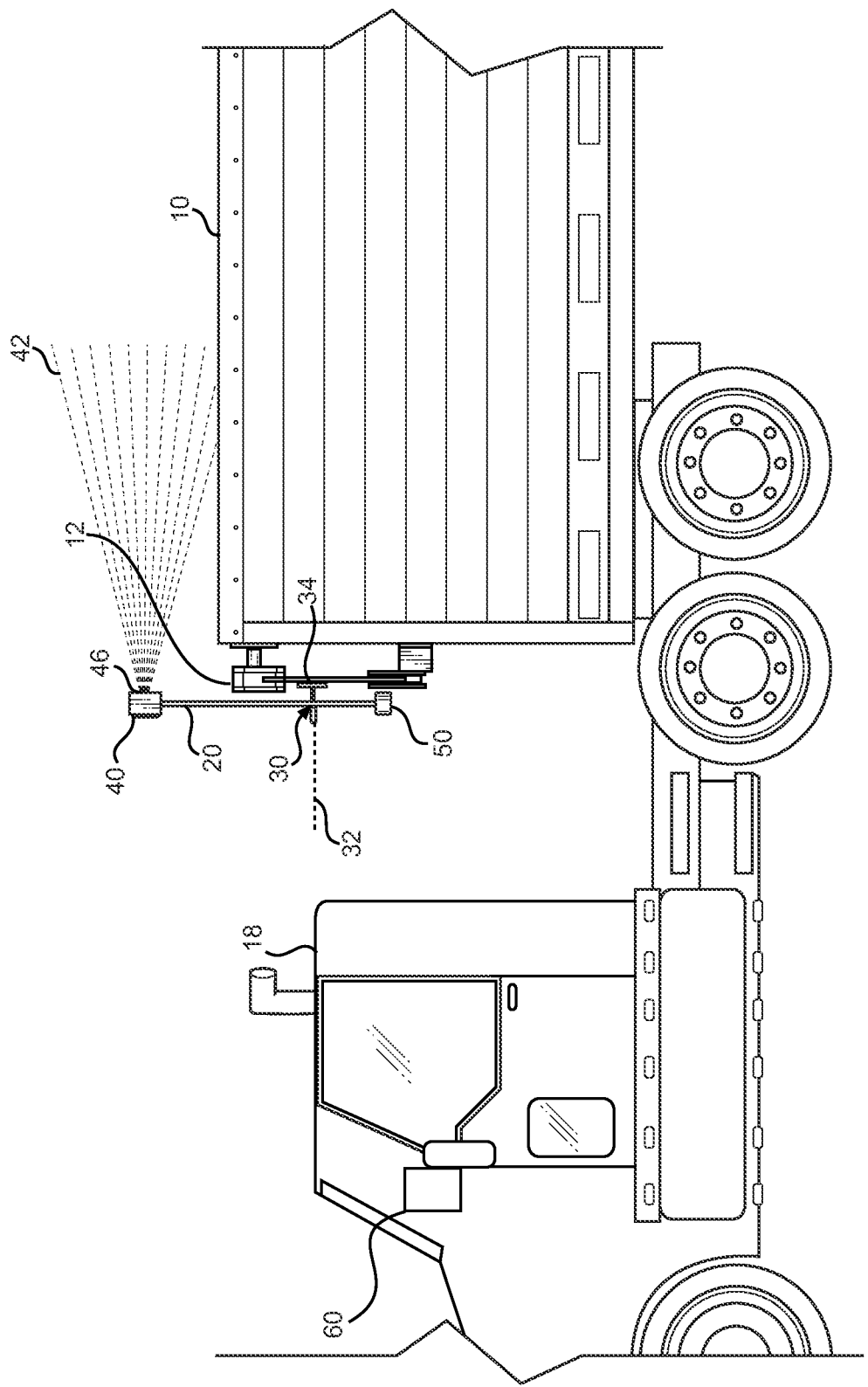
FIG. 14 is a side view of the example embodiment attached to the movable arm of the tarping system and while the tarp is in the open position.
Figure 15:
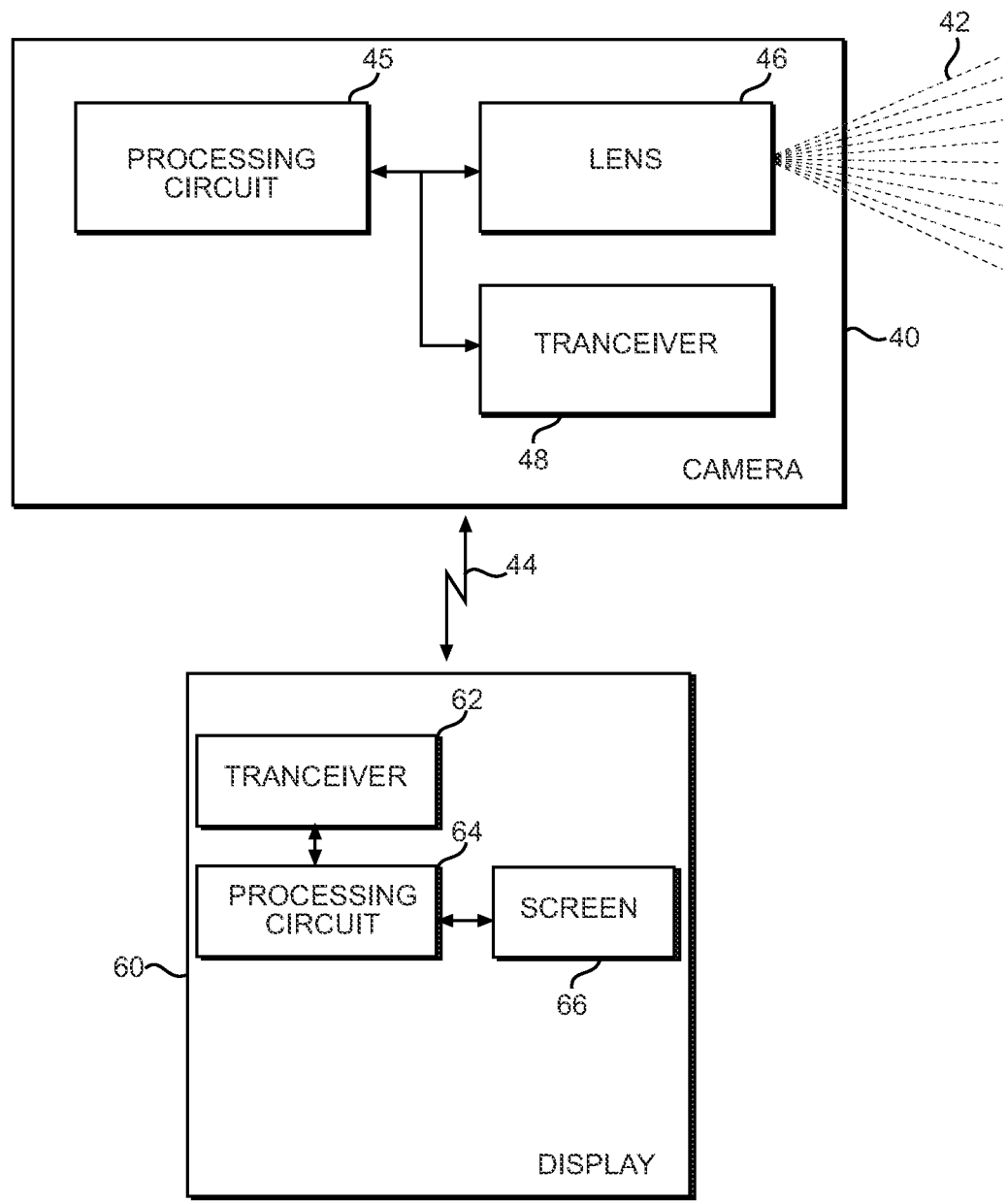
FIG. 15 is a block diagram of an implementation of the camera of the example embodiment and an implementation of the display for use with the example embodiment.

The trailer 10 includes an opening through which the cargo is loaded into the interior of the trailer 10. The cargo is also unloaded via the opening from the interior of the trailer 10. The opening of the trailer 10, best shown in shown in FIGS. 9-11, is along an entire length of the trailer 10 and is suitable for loading, unloading, and hauling particulate matter, such as dirt, gravel, grain or sand. The tarp 13 is for positioning over the opening to decrease or stop the escape of particular matter during hauling. The tarp 13 may be moved, by the movable arm 16, between an open position, in which the tarp 13 does not cover the opening, and a closed position, in which the tarp 13 covers the opening. While the tarp 13 is in the open position, the trailer 10 is accessible to load or unload a cargo. While the tarp 13 is in the open position, the camera 40 is positioned above an upper edge of the trailer 10 and the field-of-view 42 of the camera 40 is positioned over the opening of the trailer 10. While the tarp 13 is in the open position, the camera 40 may capture images of an interior of the trailer 10. The one or more images captured by the camera 40 provide information regarding a status of loading or unloading the cargo.

The pivot structure 14 of the tarping system 12 is connected to the trailer 10. The pivot structure 14 also connects to the movable arm 16. The movable arm 16 rotates around the pivot axis 15 of the pivot structure 14. The movable arm 16 moves between an uncovered orientation and a covered orientation to move the tarp 13 of the tarping system 12 between an open position and a closed position with respect to the trailer 10, and in particular with respect to the opening of the trailer 10. The movable arm 16 rotates between the uncovered orientation, referring to FIGS. 7, 11 and 14, in which the tarp does not cover the opening of the trailer 10 (e.g., open position for the tarp 13) and a covered orientation, referring to FIGS. 5, 9 and 12, in which the tarp 13 covers the opening of the trailer 10 (e.g., closed position for the tarp 13). While the movable arm 16 is oriented at an orientation between the uncovered orientation and the covered orientation, the tarp 13 only partially covers the opening of the trailer 10.

While the movable arm 16 is positioned at the uncovered orientation, the tarp 13 is in the open position and the camera 40 is positioned above an upper edge of the trailer 10. While the movable arm 16 is positioned at the uncovered orientation, the tarp 13 is in the open position, so the field-of-view 42 of the camera 40 covers the opening of the trailer 10 and captures one or more images of the interior of the trailer 10.

Figure 8:
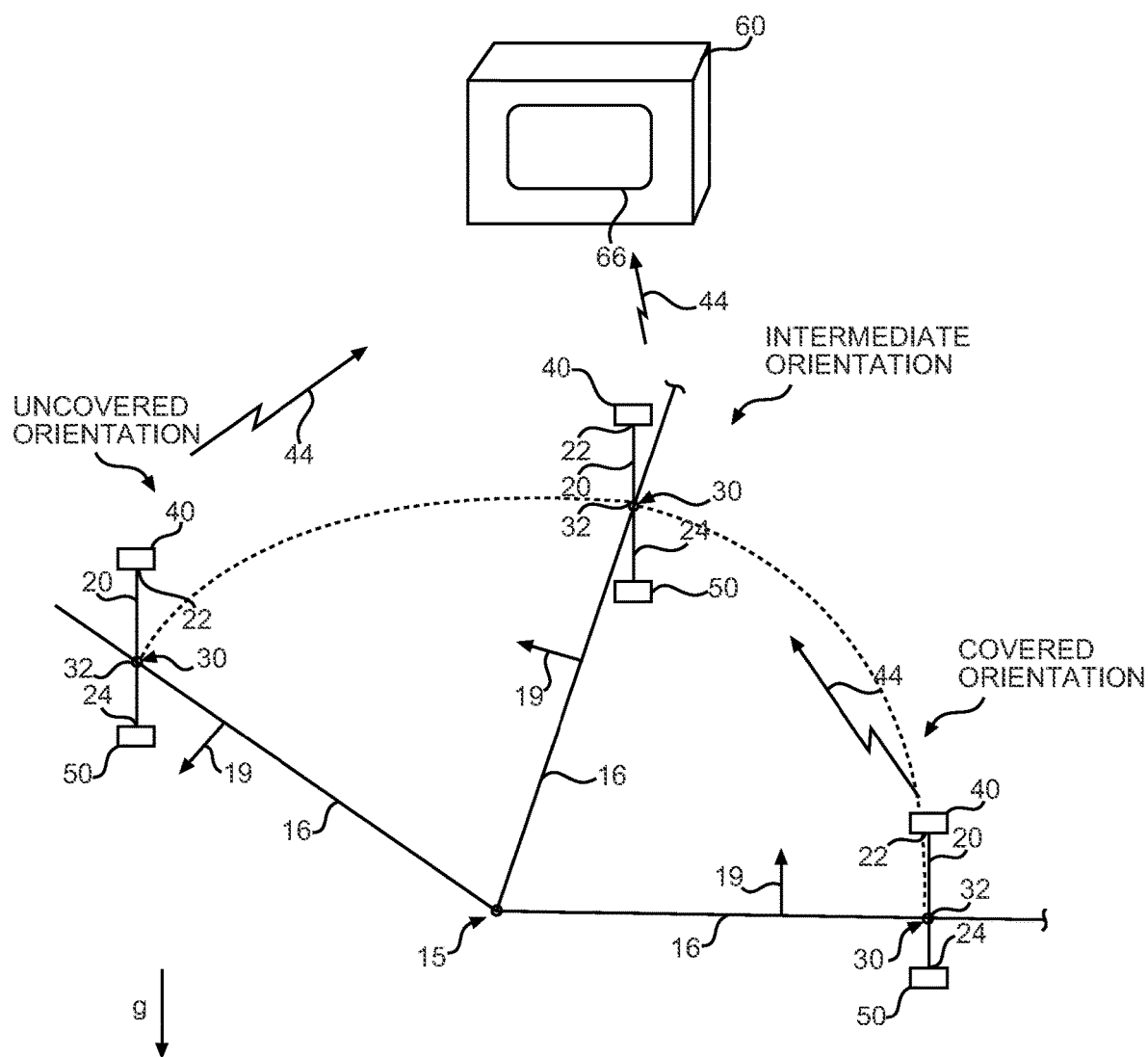
FIG. 8 is a diagram of the rotational and translational movement of the example embodiment attached to the movable arm of the tarping system and responsive to rotation of the movable arm.

As discussed above, the pivot structure 30 is configured to removably attach to the movable arm 16. While the pivot structure 30 is attached to the movable arm 16, the movable arm 16 rotates between the uncovered orientation and the covered orientation. As the movable arm 16 rotates between the uncovered orientation and the covered orientation, the angular orientation and the translational position of the pivot structure 30 changes. The relationship between the orientation of the movable arm 16 and the angular orientation and translational position of the pivot structure 30 is best illustrated in FIG. 8. The uncovered orientation of the movable arm 16, identified in FIG. 8 as "Uncovered Orientation", is represented by the line to the left of the pivot axis 15. While the movable arm 16 is positioned at the uncovered orientation, the tarp 13 is in the open position. The covered orientation of the movable arm 16, identified in FIG. 8 as "Covered Orientation", is represented by the line to the right of the pivot axis 15. At the covered orientation, the tarp 13 is in the closed position. An intermediate orientation, between the uncovered orientation and the covered orientation, identified in FIG. 8 as "Intermediate Orientation", is represented by the line between the uncovered orientation and the covered orientation. The line that represents the movable arm 16 rotates between the uncovered orientation and the covered orientation to move the tarp 13 from the open position to the closed position.

While the movable arm 16 is positioned at the covered orientation, the pivot structure 30 is positioned at a first translational position and has a first angular orientation. As the movable arm 16 rotates from the covered orientation to the intermediate orientation, the pivot structure 30 moves upward (e.g., higher on the page) with respect to the force of gravity thereby changing the translational position of the pivot structure 30. As the movable arm 16 continues to rotate from the intermediate orientation to the uncovered orientation, the pivot structure 30 moves upward to an apex and then downward until the movable arm 16 reaches the uncovered orientation. The translational change in the position of the pivot structure 30 from the covered orientation to the uncovered orientation of the movable arm 16 represents an arc, which is also indicated on FIG. 8. So, as the movable arm 16 rotates between the covered orientation and the uncovered orientation, pivot structure 30 travel along an arc.

Meanwhile, as the movable arm 16 moves from the covered orientation to the uncovered orientation, the angular (e.g., rotational) orientation of the pivot structure 30 also changes. Referring to FIG. 8, the line segment 19 represents the orientation of the fixed portion of the pivot structure 30 with respect to the movable arm 16 and with respect to the force of gravity. Because the pivot structure 30 is connected to the movable arm 16, the orientation of the fixed portion of the pivot structure 30 does not change with respect to the movable arm 16, so in this example the line segment 19 is always orthogonal to the movable arm 16. As the movable arm 16 rotates from the covered orientation to the intermediate orientation, the angular orientation of the fixed portion of the pivot structure 30 changes with respect to the force of gravity. While movable arm 16 is at the covered orientation, the line segment 19 points straight up. As the movable arm 16 rotates counterclockwise toward the intermediate orientation, the line segment 19 also rotates counterclockwise to point toward the left with respect to the page. As the movable arm 16 continues to rotate counterclockwise toward the uncovered orientation, the line segment 19 also further rotates counterclockwise to point nearly downward. The change in the direction in which the line segment 19 points in FIG. 8 makes clear that the angular orientation of the fixed portion of the pivot structure 30 changes as the orientation of the movable arm 16 changes. So, as the movable arm 16 moves between the covered orientation and the uncovered orientation, or vice versa, the angular orientation of the fixed portion of the pivot structure 30 remains orthogonal to the movable arm 16, but changes with respect to the force of gravity.

However, as the orientation of the fixed portion of the pivot structure 30 change, the force of gravity operates on the weight 50, the arm member 20 and the camera 40 to rotate the rotating portion of the pivot structure 30 to rotate about the pivot axis 32 to maintain the camera 40 positioned upward and the weight 50 positioned downward with respect to the force of gravity. The line representing gravity in FIG. 8 points downward yet the camera 40 is always oriented upward because arm member 20 rotates around the pivot axis 32 in response to the force of gravity. Further note in FIG. 8, the camera 40 is always positioned upward even though the angular orientation of the movable arm 16, as represented by the line segment 19, changes. So, regardless of the orientation of the movable arm 16, the camera 40 remains positioned upward. Maintaining the orientation of the camera 40 upward places the camera 40 in a position such that the field-of-view 42 encompasses (e.g., covers, includes) the interior of the trailer 10, so the camera 40 may provide one more images of an interior of the trailer 10 and its cargo. If the pivot structure 30 did not rotate responsive to the changes in orientation of the movable arm 16, the camera 40 would not be positioned upward and would not be able to capture images of the interior of the trailer 10.

So, the rotation of the arm member 20 to maintain the camera 40 positioned upward even as the movable arm 16 rotates, means that the camera system of the present disclosure may be mounted on the tarping system so that it does not interfere with the movement of the tarp 13, yet the camera 40 is always positioned upright to be able to provide images of the interior of the trailer and the cargo.

Because the camera 40 is connected to the pivot structure 30 through the arm member 20, the translational change in position of the camera 40, as the movable arm 16 rotates between the covered orientation and the uncovered orientation, also represents an arc. As the camera 40 translates (e.g., moves) across the arc, the vertical position (e.g., height) of the camera 40 with respect to the trailer 10 moves up and down. Referring to FIGS. 5-7 and 9-14, the vertical position of the camera 40 is at its lowest while the movable arm 16 at the covered orientation and tarp 13 covers the trailer 10, at an increased height at the intermediate and uncovered orientations when tarp 13 is completely open or only partially covers the opening of the trailer 10. As the vertical position of the camera 40 changes responsive to changes in the angular (e.g., rotational) position of movable arm 16, the camera 40 is raised and lowered above and below the upper edge of the trailer 10. While tarp 13 is moved from the closed position to the open position, the camera 40 is positioned above the upper edge of the trailer 10, so the camera 40 is in a position to capture images of an interior of the trailer 10. So, the camera 40 is positioned above the upper edge of the trailer 10 while the tarp 13 does not cover the opening of the trailer 10 thereby allowing the camera 40 to capture images of the interior of the trailer 10 during loading and unloading. The images of the interior the trailer may be transmitted by the camera 40 to the display 60. The driver may watch the images on the display 60 from the cabin of the tractor 18 to monitor a status of loading or unloading the cargo.

Figure 6:
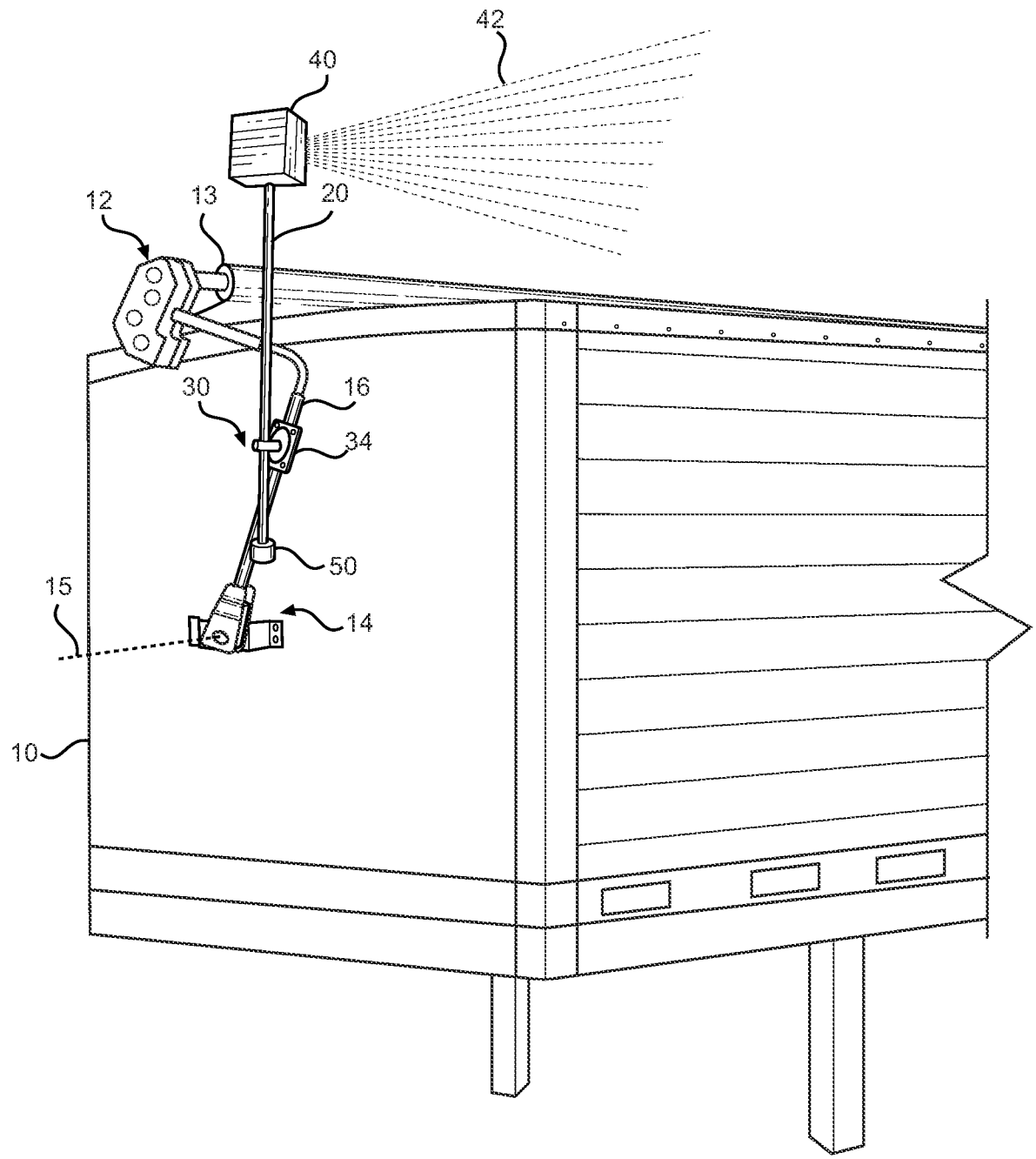
FIG. 6 is a perspective view of the example embodiment attached to the movable arm of the tarping system and while the tarp of the tarping system is in an intermediate position.
Figure 7:
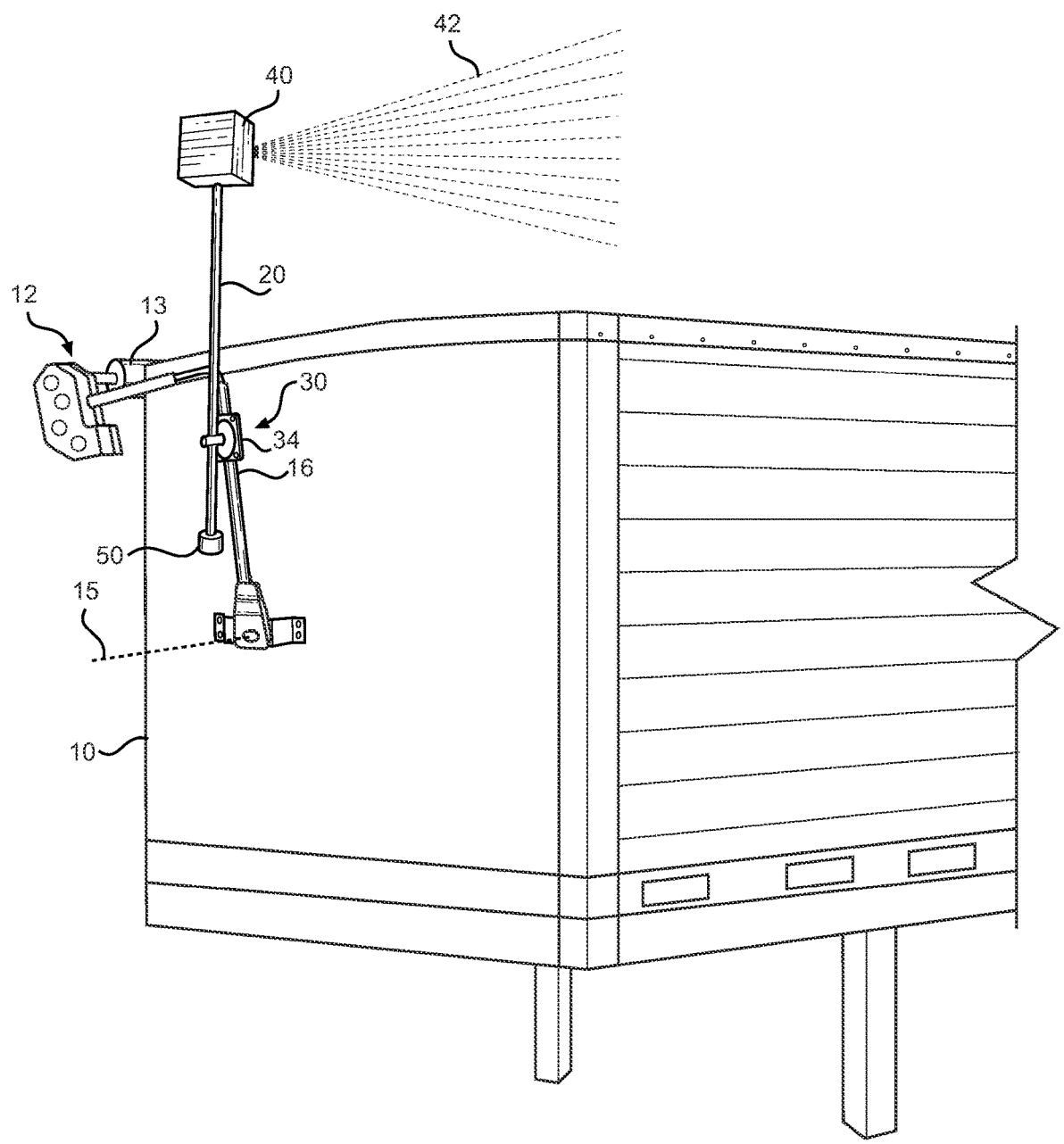
FIG. 7 is a perspective view of the example embodiment attached to the movable arm of the tarping system and while the tarp of the tarping system is in an open position.

As discussed earlier, the pivot structure 30 may be mounted using the mount 34 at any position along a length of the movable arm 16. Mounting the pivot structure 30 closer (e.g., proximate) to the pivot axis 15 decreases the change in height experience by the camera 40 as movable arm 16 rotates between the covered orientation and the uncovered orientation. Mounting the pivot structure 30 further away (e.g., distal) from the pivot axis 15 increases the change in height experienced by camera 40 as movable arm rotates between the covered orientation and the uncovered orientation. As best seen in FIGS. 6 and 7, mounting the pivot structure 30 proximate to the pivot structure 14 decreases the height of the camera 40 with respect to the upper edge of the trailer 10. Mounting the pivot structure 30 away from (e.g., distal) from the pivot structure 14 increases the height of the camera 40 with respect to the upper edge of the trailer 10.

If the camera 40 is not positioned above the upper edge of the trailer 10, the field-of-view 42 of the camera 40 is blocked by the side of the trailer 10, thereby blocking the view the camera 40 has into the interior of the trailer 10. The mounting point of the pivot structure 30 along the length of the movable arm 16 may be selected so that the camera 40 is positioned above the upper edge of the trailer 10 while the tarp 13 is open. If the camera 40 is not positioned above the upper edge of the trailer 10 while the movable arm 16 is at the uncovered orientation, the camera 40 will not be able to capture images of the interior of the trailer during loading and unloading.

H. Operation of Preferred Embodiment

In use, the tractor 18 is connected to the trailer 10. A driver operates the tractor 18 to haul (e.g., move, pull) the trailer 10. While the driver drives the tractor 18 to haul a load in the trailer 10, the tarp 13 must cover the opening of trailer 10 so that the load cannot exit the trailer 10. Covering the trailer 10 with the tarp 13 is particularly important when the trailer 10 is used to haul particulate material, such as gravel. Without the tarp 13, the particulate matter could fall or bounce out of the trailer 10 while in transit and could do damage to other vehicles on the highway, such as breaking a windshield.

When the driver arrives at a location to pick up the system cargo, for example a load of gravel, the driver uses the tractor 18 to position the trailer 10 for receiving the load. Because the driver has just come off of the highway, the tarp 13 covers the trailer 10. Prior to loading, the driver may exit the tractor 18 to remove the locking mechanism 38 from the plate 36 and the mount 34. The locking mechanism 38 holds the arm member 20 in a stowed position during transit to protect the camera 40 from damage. Removing the locking mechanism 38, frees the arm member 20 to rotate around the pivot axis 32. The driver may also apply power to the camera 40, so the camera 40 may operate. The driver returns to the cabin of the tractor 18 and applies power to the display 60. The driver may then operate the tarping system 12 to begin removing the tarp 13 from the opening of the trailer 10.

As the tarping system 12 operates to remove the tarp 13 from the trailer 10, the movable arm 16 begins to rotate from the covered orientation toward the uncovered orientation. While movable arm 16 is at the covered orientation, the camera 40 may be positioned below an upper edge of the trailer 10 so that the field-of-view 42 is blocked by the side of the trailer 10. Because the camera 40 is transmitting captured images to the display 60, the driver in the tractor 18 sees only the side of the trailer 10.

As the movable arm 16 rotates toward the uncovered orientation, the tarp 13 begins to move across the top of the trailer 10 as it moves from the closed position to the open position. As the movable arm 16 rotates toward the uncovered orientation, the movable arm 16 lifts the pivot structure 30, the arm member 20, the weight 50 and thereby the camera 40 upward such that the lens 46 of the camera 40 is positioned above the upper edge of the trailer 10. As soon as the lens 46 is positioned above the upper edge of the trailer 10, the camera 40 captures images of the interior of the trailer 10. Until the movable arm 16 reaches the uncovered orientation, the camera 40 captures and transmits images of the tarp 13 been removed from the top of the trailer 10. Since the images of the tarp 13 being removed from the trailer 10 are transmitted to the display 60, the driver may monitor the removal of the tarp 13 from the trailer 10. If a problem occurs while removing the tarp 13, the driver will be able to detect the problem via the display 60 and will be able to stop the tarping system 12 before it can be damaged.

Once the movable arm 16 reaches the uncovered orientation, the tarp 13 is completely removed from the trailer 10 thereby providing access to the opening of trailer 10 to load the cargo. Further, the camera 40 is positioned above the upper edge of the trailer 10 and is capturing images of the interior of the trailer. The images captured by the camera 40 are transmitted to the display 60 and may be viewed by the driver while positioned in the tractor 18. The driver may use the images provided by the camera 40 to verify that the tarp 13 is in the open position so that the cargo may be loaded.

As the movable arm 16 rotates from the covered orientation to the uncovered orientation to move the tarp 13 from the closed position to the open position, the arm member 20 rotates around the pivot axis 32 of the pivot structure 30, as discussed above, to maintain the camera 40 oriented upward and the weight 50 downward. Maintaining the orientation of the camera 40 upward keeps the camera 40 positioned above the upper edge of the trailer 10 and oriented to provide the images of the interior of the trailer 10.

Once the tarp 13 is the open position, the loading process may begin. Particulate material is generally loaded from a source positioned above the trailer 10. The material generally exits the source via a chute, a pipe or a conveyor belt and falls into the interior of the trailer 10. As the particulate matter falls into the trailer 10, it forms conical piles that do not distribute themselves evenly along the length of the trailer 10. However, because the camera 40 is continuously transmitting images of the interior of the trailer 10 to the display 60, the driver may monitor the amount and location of the particulate material in the trailer 10 and may move the trailer 10 forward, or backwards, as necessary to evenly load the material along an entire length of the trailer 10. Because the display 60 is positioned in the tractor 18, the driver may monitor the status of loading the trailer 10 and operate the tractor 18 to move the trailer 10 as necessary while the trailer 10 is being loaded. For example, if loading starts at the front of the trailer 10, as the front fills up, the driver may operate the tractor 18 to pull the trailer 10 forward, during loading, to evenly load the trailer 10 along its entire length.

Once the cargo has been loaded, the driver may operate the tarping system 12 to move the tarp 13 from the open position to the closed position so that the load may be hauled to its destination while the tarp 13 covers the trailer 10. As the movable arm 16 moves from the uncovered orientation the covered orientation, the arm member 20 rotates around the pivot axis 32 to maintain the camera 40 oriented upward and the weight 50 oriented downward. Because the camera 40 is oriented upward and the lens 46 is positioned above an upper edge of the trailer 10, the camera 40 provides images to the display 60 of the tarp 13 as it moves from the open position to the closed position. The driver may monitor the tarping system 12 for problems. Because the driver is in the tractor 18 and is monitoring operation of the tarping system 12 via the display 60, the driver may stop the operation of the tarping system 12 if a problem is detected.

Once the tarp 13 is in the closed position, the driver may exit the tractor 18 to place the locking mechanism 38 on the mount 34 and the plate 36 to hold the arm member 20 in the stowed position during transit. After securing the arm member 20, the driver may return to the tractor 18 and drive to the destination to unload the cargo.

Once at the destination, the driver may exit the tractor 18 to remove the locking mechanism 38 from the mount 34 and the plate 36 so that the arm member 20 may freely rotate about the pivot axis 32. The driver returns to the tractor 18 and operates the tarping system 12 to move the tarp 13 from the closed position to the open position. As the movable arm 16 rotates from the covered orientation, in which the tarp 13 is in the closed position, to the uncovered orientation, in which the tarp 13 is in the open position, the movable arm 16 lifts the pivot structure 30, the arm member 20, the weight 50 and the camera 40 from a lower height to a greater height where the camera 40 is positioned above the upper edge of the trailer 10 such that the camera 40 may capture images of the tarp 13 as it opens and of the interior of the trailer 10, which presently holds a load. Further, as the movable arm 16 rotates from the covered orientation to the uncovered orientation, the arm member 20 rotates around the pivot axis 32 to maintain the camera 40 oriented upward and the weight 50 oriented downward. Because the camera 40 is oriented above the upper edge of the trailer 10, the camera 40 may capture one or more images of the load in the interior of the trailer 10. The camera 40 transmits the images to the display 60, which is located in the tractor 18. The driver may monitor the images on the display 60 to verify the proper opening of the tarp 13 and to know when he may begin unloading the cargo.

There are various methods for unloading a cargo, however with particulate material it is common for the trailer 10 to rotate around a point near the back end of the trailer 10 so that the particulate material slides out of the rear end of the trailer 10. As the front end of the trailer lifts, the camera 40 is still positioned above the upper edge of the trailer 10 and may provide images of the load as it slides out of the interior of the trailer 10. The driver, still positioned in the tractor 18, may monitor the unloading of the cargo and operate the tractor 18 to move the trailer 10 when necessary. In this example, as the cargo exits the rear of the trailer, the driver may need to pull the trailer 10 forward to successfully get all of the cargo out of the trailer 10.

Once the cargo is unloaded, the driver may operate the tarping system 12 to move the tarp 13 to the closed position over the trailer 10. The driver may also exit the tractor 18 to attached the locking mechanism 38 to the mount 34 and the plate 36 to fix (e.g., lock) the arm member 20 in a stowed position. The driver may then return to the tractor 18 to haul the trailer 10 to get another load.

I. Other Considerations

For the below analysis, the length of the arm member 20 between the pivot structure 30 and the first end 22 is referred to as the camera arm length and the length of the arm member 20 between the pivot structure 30 and the second end 24 is referred to as the weight arm length.

As discussed above, it is preferable that the weight arm length be shorter than the camera arm length. As the arm member 20 rotates about the pivot axis 32 to maintain the camera 40 upward and the weight 50 downward with respect to gravity, the arm member 20 swings similarly to a pendulum. The period of oscillation a simple pendulum is described by the formula:

$$T = 2\pi \sqrt{L/g}$$

where:
L=the length of the pendulum (i.e., the weight arm length); and
g=the gravitational force of gravity (e.g., 9.8 m/s$^2$).

The above formula is for a simple, frictionless pendulum. Because the pivot structure 30 will experiences friction, any oscillations in the arm member 20 will be dampened and die out. However, making the value of L shorter, as opposed to longer, helps to reduce the amount of time that the arm member 20 may oscillate. For example, making the weight arm length 3 meters long establishes the period of oscillation to be about 3.5 seconds. So, in other words, as the movable arm 16 moves from the covered position to the uncovered position, the arm member 20 may swing back and forth for up to 3.5 seconds on-and-off. Making the weight arm length 1 meter long establishes the period of oscillation to be about 65 ms. The difference in the period of oscillation indicates that even though the friction in the pivot structure 30 will dampen any oscillations in the arm member 20, it is better to have the weight arm length be shorter rather than longer.

However, as the weight arm length decreases, the mass of the weight 50 must increase to establish the center of gravity below the pivot axis 32. The arm member 20 acts as a lever. The camera 40 is positioned at one end of the lever and the weight 50 at the other end of the lever while the pivot structure 30 functions as a fulcrum. If the camera arm length is the same length as the weight arm length, the weight 50 could have slightly more mass than the camera 40 and still cause the arm member 20 to rotate so that the weight 50 is oriented downward and the camera 40 is oriented upward. This is because the mass of the camera 40 and the mass of the weight 50 are situated the same distance from the fulcrum. As the weight arm length decreases, so that it is shorter than the camera arm length, the mass of the camera 40 is now farther from the fulcrum than the mass of the weight 50, so the mass of the camera 40 can move (e.g., rotate) the heavier weight 50 upward. In order to keep the camera 40 oriented upward, the mass of the weight 50 must be increased so that the mass of the weight 50 on its shorter portion of the lever can move the camera 40 upward even though the camera 40 is on the longer portion of the lever.

The mass of the camera 40 applies a torsion force in a direction on the pivot structure 30 that is proportional to the mass of the camera 40 and its distance from the pivot structure 30. The mass of the weight 50 applies a torsion force in the opposite direction on the pivot structure 30 that is proportional to the mass of the weight 50 and its distance from the pivot structure 30. In order to keep the camera 40 oriented upward, the torsion force applied by the weight 50 must be greater than the torsion force applied by the camera 40. As the weight arm length decreases, the torsion force applied by the weight 50 decreases thereby allowing the torsion force applied by the camera 40 to rotate the camera 40 downward. In order to keep the camera 40 oriented upward, the mass of the weight 50 must be increased to overcome the difference in length and the mass of the camera 40. As the mass of the weight 50 increases, the torsion force applied by the weight 50 also increases. The mass of the weight 50 must be increased until the torsion force applied by the weight 50 through its shorter weight arm length lever is greater than the torsion force applied by the camera 40 through its longer camera arm length. So, even though it is desirable to keep the camera arm length short to decrease the period of oscillation of the arm member 20, the mass of the weight 50 must be increased to keep the camera 40 oriented upward. Unless otherwise defined, all technical and scientific terms used herein have the same meaning as commonly understood by one of ordinary skill in the art to which this invention belongs. Although methods and materials similar to or equivalent to those described herein can be used in the practice or testing of the camera system for particulate material trailer, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The camera system for particulate material trailer may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A camera system for a trailer, comprising:
   an arm member having a first end and a second end, wherein the arm member is adapted to be pivotally attached about a pivot axis between the first end and the second end to a movable arm of a tarping system of a trailer;
   a camera connected to the arm member at a first position between the pivot axis and the first end of the arm member; and
   a weight connected to the arm member at a second position between the pivot axis and the second end of the arm member, and wherein responsive to a force of gravity on the weight, the arm member rotates about the pivot axis to orient the weight downward and the camera upward with respect to the force of gravity regardless of an orientation of the movable arm.

2. The camera system of claim 1, wherein the first position where the camera is connected to the arm member is at or near the first end of the arm member.

3. The camera system of claim 1, wherein the second position where the weight is connected to the arm member is at or near the second end of the arm member.

4. The camera system of claim 1, wherein a length of the arm member is adjustable.

5. The camera system of claim 4, wherein the arm member extends and retracts to adjust the length.

6. The camera system of claim 4, wherein the arm member between the pivot axis and the first end includes a first segment and a second segment, and wherein the first segment moves relative to the second segment to adjust the length.

7. The camera system of claim 1, wherein a first length of the arm member between the pivot axis and the first end is greater than a second length of the arm member between the pivot axis and the second end.

8. The camera system of claim 1, wherein the camera includes a lens and a wireless transmitter, wherein the lens establishes a field-of-view of the camera, and wherein the camera transmits, via the wireless transmitter to a display, one or more images of an interior of the trailer captured in the field-of-view of the camera.

9. The camera system of claim 1, wherein a mass of the weight establishes a center of gravity of the arm member and the camera below the pivot axis.

10. The camera system of claim 1, wherein the movable arm moves between an uncovered orientation and a covered orientation to move a tarp of the tarping system between an open position and a closed position respectively with respect to the trailer, and wherein while the movable arm is at the uncovered orientation, the camera is positioned above an upper edge of the trailer whereby the camera provides one or more images of an interior of the trailer.

11. The camera system of claim 10 wherein while the movable arm is at the uncovered orientation, the tarp is in the open position thereby providing access for a cargo to be loaded into or unloaded from the trailer, and wherein the one or more images provide a status of loading or unloading the cargo.

12. The camera system of claim 11, wherein the camera includes a transmitter, wherein the camera transmits the one or more images to a display positioned in a vehicle connected to the trailer, and wherein the display provides the status to a driver of the vehicle while the driver is positioned in the vehicle.

13. The camera system of claim 12, wherein responsive to the status, the driver may operate the vehicle to move the trailer to aid in loading or unloading the cargo.

14. The camera system of claim 1, wherein responsive to a change in the orientation of the movable arm and to the force of gravity, the arm member rotates about the pivot axis to maintain the camera upward with respect to the force of gravity.

15. The camera system of claim 1, wherein the movable arm moves a tarp of the tarping system between a closed position and an open position with respect to the trailer, wherein while the tarp is in the open position, the tarp does not cover the trailer, the camera is positioned above an upper edge of the trailer, and the camera captures one or more images of an interior of the trailer.

16. A camera system for a trailer, comprising:
   an arm member having a first end and a second end, wherein the arm member is adapted to be pivotally attached about a pivot axis between the first end and the second end to a movable arm of a tarping system of a trailer;
   a camera connected to the arm member at or near the first end of the arm member; and
   a weight connected to the arm member at a second position at or near the second end of the arm member, and wherein responsive to a force of gravity on the weight, the arm member rotates about the pivot axis to orient the weight downward and the camera upward with respect to the force of gravity regardless of an orientation of the movable arm.

17. The camera system of claim 16, wherein a length of the arm member is adjustable.

18. The camera system of claim 16, wherein a first length of the arm member between the pivot axis and the first end is greater than a second length of the arm member between the pivot axis and the second end.

19. The camera system of claim 16, wherein the camera includes a lens and a wireless transmitter, wherein the lens establishes a field-of-view of the camera, and wherein the camera transmits, via the wireless transmitter to a display, one or more images of an interior of the trailer captured in the field-of-view of the camera.

20. A camera system for a trailer, comprising:
an arm member having a first end and a second end, wherein the arm member is adapted to be pivotally attached about a pivot axis between the first end and the second end to a movable arm of a tarping system of a trailer;
a camera connected to the arm member at or near the first end of the arm member; and
a weight connected to the arm member at a second position at or near the second end of the arm member, and wherein responsive to a force of gravity on the weight, the arm member rotates about the pivot axis to orient the weight downward and the camera upward with respect to the force of gravity regardless of an orientation of the movable arm;
wherein a mass of the weight establishes a center of gravity of the arm member and the camera below the pivot axis;
wherein responsive to a change in the orientation of the movable arm and to the force of gravity, the arm member rotates about the pivot axis to maintain the camera upward with respect to the force of gravity.

* * * * *